United States Patent
Nakamura

(10) Patent No.: US 11,189,984 B2
(45) Date of Patent: Nov. 30, 2021

(54) EXCITATION LIGHT SOURCE APPARATUS AND GAIN EQUALIZING METHOD

(71) Applicant: NEC Corporation, Tokyo (JP)

(72) Inventor: Kohei Nakamura, Tokyo (JP)

(73) Assignee: NEC CORPORATION, Tokyo (JP)

(*) Notice: Subject to any disclaimer, the term of this patent is extended or adjusted under 35 U.S.C. 154(b) by 571 days.

(21) Appl. No.: 16/086,335

(22) PCT Filed: Mar. 22, 2017

(86) PCT No.: PCT/JP2017/011318
§ 371 (c)(1),
(2) Date: Sep. 19, 2018

(87) PCT Pub. No.: WO2017/170008
PCT Pub. Date: Oct. 5, 2017

(65) Prior Publication Data
US 2019/0089117 A1 Mar. 21, 2019

(30) Foreign Application Priority Data
Mar. 30, 2016 (JP) .............................. JP2016-067731

(51) Int. Cl.
*H01S 3/091* (2006.01)
*H04B 10/294* (2013.01)
(Continued)

(52) U.S. Cl.
CPC .............. *H01S 3/0912* (2013.01); *G02F 1/35* (2013.01); *H04B 10/25* (2013.01); *H04B 10/294* (2013.01);
(Continued)

(58) Field of Classification Search
CPC ....... H01S 3/0912; H01S 3/30; H04B 10/298; H04B 10/2942; H04B 10/2916;
(Continued)

(56) References Cited

U.S. PATENT DOCUMENTS 6,466,348 B1 * 10/2002 Izumi ................. H04B 10/2939
398/177
7,245,421 B2 * 7/2007 Sakamoto .......... H04B 10/2916
359/334
(Continued)

FOREIGN PATENT DOCUMENTS

JP      2001-223646 A    8/2001
JP      2001-249369 A    9/2001
(Continued)

OTHER PUBLICATIONS

Extended European Search Report for EP Application No. 17774549.4 dated Oct. 4, 2019.
(Continued)

*Primary Examiner* — Abbas H Alagheband
(74) *Attorney, Agent, or Firm* — Sughrue Mion, PLLC

(57) ABSTRACT

An excitation light source apparatus capable of assuring an excellent optical transmission characteristic even at occurrence of a gain tilt is provided. The excitation light source apparatus comprises an excitation light outputting means, a control signal detection means, a control signal detection means, an excitation light control means, and a multiplexing means. The excitation light outputting means outputs excitation light for Raman amplification. The control signal detection means detects a control signal of the excitation light outputting means from beams of WDM signal light transmitted through optical fibers in an upstream direction and a downstream direction. The excitation light control means controls the excitation light outputting means, based on the control signal. The multiplexing means multiplexes the excitation light and each of the beams of the WDM signal light, and outputs the respective multiplexed beams of light to the optical fiber.

20 Claims, 15 Drawing Sheets

(51) Int. Cl.
  *H04J 14/02* (2006.01)
  *G02F 1/35* (2006.01)
  *H04B 10/291* (2013.01)
  *H04B 10/25* (2013.01)
  *H04B 10/079* (2013.01)
  *H04B 10/077* (2013.01)
  *H04B 10/293* (2013.01)
  *H01S 3/30* (2006.01)

(52) U.S. Cl.
  CPC ........ *H04B 10/298* (2020.05); *H04B 10/2916* (2013.01); *H04B 10/2942* (2013.01); *H04J 14/02* (2013.01); *H01S 3/30* (2013.01); *H04B 10/0775* (2013.01); *H04B 10/0797* (2013.01); *H04B 10/2933* (2013.01)

(58) Field of Classification Search
  CPC ......... H04B 10/25; H04B 10/294; G02F 1/35; H04J 14/02
  USPC ........................................................ 359/345
  See application file for complete search history.

(56) References Cited

U.S. PATENT DOCUMENTS

| | | | | |
|---|---|---|---|---|
| 7,343,102 B2* | 3/2008 | Tomofuji | ........... | H04B 10/0775 398/140 |
| 8,139,951 B2* | 3/2012 | Samartsev | ....... | H04B 10/07955 398/181 |
| 2001/0003486 A1* | 6/2001 | Mikami | ............. | H04B 10/2916 398/146 |
| 2001/0019448 A1 | 9/2001 | Yokoyama | | |
| 2002/0041429 A1* | 4/2002 | Sugaya | ................... | H01S 3/302 359/334 |
| 2002/0105716 A1* | 8/2002 | Tanaka | ............... | H04B 10/2916 359/334 |
| 2002/0122242 A1* | 9/2002 | Shimojoh | .......... | H04B 10/2931 359/334 |
| 2003/0117692 A1* | 6/2003 | Tanaka | ................ | H04B 10/071 359/334 |
| 2004/0114213 A1* | 6/2004 | Yamaguchi | ......... | H01S 3/13013 359/341.3 |
| 2004/0170434 A1 | 9/2004 | Yokoyama | | |
| 2005/0036790 A1* | 2/2005 | Tanaka | .................... | H01S 3/302 398/177 |
| 2006/0018658 A1* | 1/2006 | Mori | .................. | H04J 14/0221 398/79 |
| 2007/0024957 A1* | 2/2007 | Charlet | ............... | H04J 14/0227 359/334 |
| 2008/0049303 A1* | 2/2008 | Nakata | .................... | H01S 3/302 359/334 |
| 2008/0291529 A1* | 11/2008 | Onaka | ................. | H01S 3/06758 359/334 |
| 2010/0073762 A1* | 3/2010 | Onaka | .................... | H01S 3/302 359/334 |
| 2010/0129081 A1 | 5/2010 | Onaka | | |
| 2011/0141552 A1 | 6/2011 | Ghera et al. | | |

FOREIGN PATENT DOCUMENTS

| | | |
|---|---|---|
| JP | 2002-258335 A | 9/2002 |
| JP | 2003-177440 A | 6/2003 |
| JP | 2004-064500 A | 2/2004 |
| JP | 2008-052001 A | 3/2008 |
| JP | 2010-097185 A | 4/2010 |
| JP | 2010-122548 A | 6/2010 |

OTHER PUBLICATIONS

Japanese Office Action for JP Application No. 2018-509107 dated Sep. 1, 2020 with English Translation.
International Search Report for PCT Application No. PCT/JP2017/011318, dated Jun. 20, 2017.
English translation of Written opinion for PCT Application No. PCT/JP2017/011318.
Japanese Office Action for JP Application No. 2018-509107 dated Sep. 10, 2019 with English Translation.
Chinese Office Action for CN Application No. 201780019980.1 dated Dec. 30, 2020 with English Translation.

* cited by examiner

EXCITATION LIGHT SOURCE APPARATUS AND GAIN EQUALIZING METHOD

This application is a National Stage Entry of PCT/JP2017/011318 filed on Mar. 22, 2017, which claims priority from Japanese Patent Application 2016-067731 filed on Mar. 30, 2016, the contents of all of which are incorporated herein by reference, in their entirety.

TECHNICAL FIELD

The present invention relates to an excitation light source apparatus, a gain equalizing apparatus, and an optical repeater used in an optical fiber transmission relay system that transmits wavelength division multiplexing (WDM) signal light.

BACKGROUND ART

In recent years, as a technique for constructing an optical communication network that enables large-capacity communication over a long distance, a wavelength division multiplexing (WDM) transmission technique for multiplexing a plurality of wavelengths and collectively amplifying the wavelengths is adopted in an optical repeater installed in each relay section.

In an optical fiber transmission relay system that transmits wavelength division multiplexing signal light (hereinafter described as WDM signal light), a level of WDM signal light during transmission needs to be managed in order to maintain uniform and excellent transmission quality of the WDM signal light, and it is important to equalize a gain deviation occurring in an optical repeater. Thus, WDM signal light transmitted through an optical fiber is monitored at a time of system introduction by using a gain equalizing apparatus in which a Raman optical amplifier as described in PTL 1 is introduced. When a gain deviation occurs in output of an optical repeater, the gain equalizing apparatus equalizes the gain deviation occurring in the optical repeater and adjusts the system in a state where excellent transmission quality is obtained. Further, PTLs 2 and 3 also disclose a technique for equalizing a gain deviation by using a Raman optical amplifier similarly.

CITATION LIST

Patent Literature

[PTL 1] Japanese Unexamined Patent Application Publication No. 2008-52001
[PTL 2] Japanese Unexamined Patent Application Publication No. 2010-122548
[PTL 3] Japanese Unexamined Patent Application Publication No. 2010-97185

SUMMARY OF INVENTION

Technical Problem

A system operation is performed over a long period of time in an optical fiber transmission relay system that transmits WDM signal light. In the system operation over a long period of time, an increase in a gain deviation due to repair of an optical fiber, aged deterioration of an optical fiber, and the like is concerned in the techniques described in PTLs 1 to 3 even when gain equalization is performed at a time of initial introduction. Thus, achieving a gain equalizing function capable of actively handling a change in a gain tilt during system operation is a problem.

The present invention has been made in view of the above-mentioned situations, and an object thereof is to provide an excitation light source apparatus and a gain equalizing method, being capable of assuring an excellent optical transmission characteristic even at occurrence of a gain tilt due to aged deterioration of an optical fiber and the like in an optical fiber transmission relay system that transmits WDM signal light.

Solution to Problem

An excitation light source apparatus according to the present invention is an apparatus that is installed in a relay section of an optical fiber in an optical fiber transmission relay system transmitting wavelength division multiplexing (WDM) signal light being wavelength-multiplexed, and outputs excitation light for Raman amplification at occurrence of a gain tilt of the WDM signal light. The excitation light source apparatus according to the present invention includes an excitation light outputting means, a control signal detection means, a control signal detection means, an excitation light control means, and a multiplexing means. The excitation light outputting means outputs excitation light for Raman amplification. The control signal detection means detects a control signal of the excitation light outputting means from beams of WDM signal light transmitted through optical fibers in an upstream direction and a downstream direction. The excitation light outputting means controls the excitation light outputting means, based on the control signal. The multiplexing means multiplexes the excitation light and each of the beams of the WDM signal light in the upstream direction and the downstream direction, and outputs the respective multiplexed beams of light to the optical fiber in the upstream direction and the optical fiber in the downstream direction.

A gain equalizing method according to the present invention is a gain equalizing method that is installed in a relay section of an optical fiber in an optical fiber transmission relay system transmitting wavelength division multiplexing (WDM) signal light being wavelength-multiplexed, and is used at occurrence of a gain tilt of the WDM signal light. The gain equalizing method according to the present invention detects a control signal of an excitation light source that outputs excitation light for Raman amplification from beams of WDM signal light transmitted through optical fibers in an upstream direction and a downstream direction. The gain equalizing method according to the present invention controls the excitation light source, based on the control signal, and outputs excitation light for Raman amplification from the excitation light source. The gain equalizing method according to the present invention multiplexes the excitation light and each of the beams of the WDM signal light in the upstream direction and the downstream direction, and outputs the respective multiplexed beams of light to the optical fiber in the upstream direction and the optical fiber in the downstream direction.

Advantageous Effects of Invention

According to the present invention, an excellent optical transmission characteristic can be assured even at occurrence of a gain tilt due to aged deterioration of an optical fiber, and the like.

EXAMPLE EMBODIMENT

Figure 1:
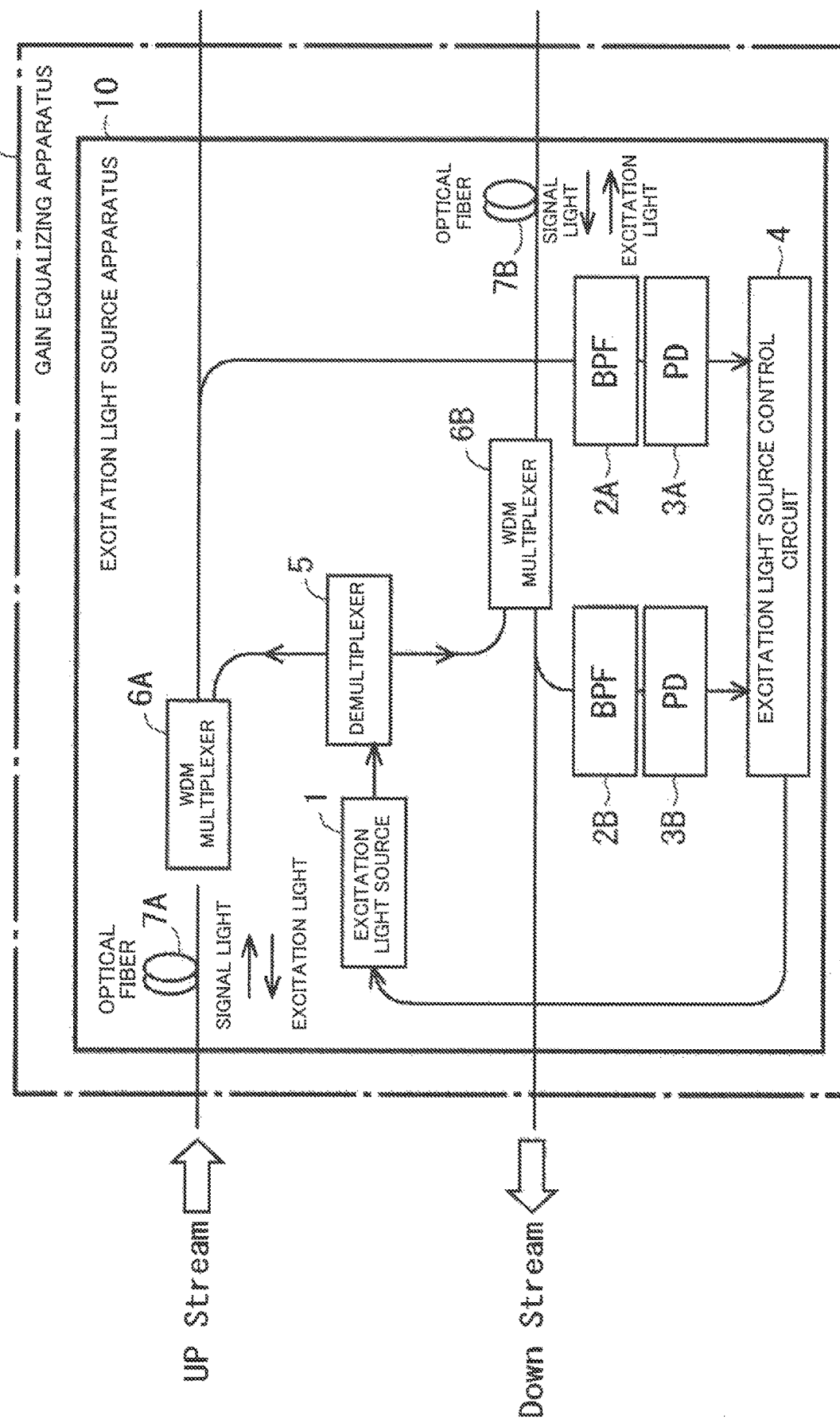
FIG. 1 is a block configuration diagram illustrating a configuration of an excitation light source apparatus in a first example embodiment of the present invention.

Hereinafter, appropriate example embodiments of an excitation light source apparatus, a gain equalizing apparatus, and an optical repeater according to the present invention will be described with reference to accompanying drawings. An excitation light source apparatus in each example embodiment of the present invention is introduced in an optical fiber transmission relay system that transmits wavelength division multiplexing (WDM) signal light (hereinafter described as WDM signal light) in an optical fiber in which an optical repeater is appropriately disposed in each relay section. The excitation light source apparatus is, for example, built in a gain equalizing apparatus including a gain equalizing function of compensating for a deviation of a gain wavelength characteristic of input WDM signal light.

Further, the excitation light source apparatus may be built in an optical repeater including a function of amplifying and relaying input WDM signal light. Alternatively, the excitation light source apparatus may be installed as an individual apparatus separately from the gain equalizing apparatus and the optical repeater between the gain equalizing apparatus and the optical repeater and the like on an optical fiber. Further, drawing reference signs provided to each following drawing are provided to respective components as one example to facilitate understanding for the sake of convenience, and it is needless to say that the signs are not intended for limiting the present invention to illustrated aspects.

(Characteristic of Present Invention)

Prior to description of each example embodiment of the present invention, an outline of a characteristic of the present invention will be described first.

The present invention relates to an excitation light source apparatus, a gain equalizing apparatus, and an optical repeater in an optical fiber transmission relay system. The present invention is mainly characterized in that compensating for an optical spectral tilt of wavelength division multiplexing signal light (WDM signal light) occurring during system operation by using a Raman amplification effect in an optical fiber to maintain excellent transmission quality close to that at start of the operation over a long-term operational period.

In other words, the optical fiber transmission relay system in each example embodiment of the present invention includes an excitation light source apparatus for Raman amplification and a gain equalizing apparatus including the excitation light source apparatus built therein or an optical repeater including the excitation light source apparatus built therein in a relay section of an optical fiber (optical transmission path). In the optical fiber transmission relay system, loss variations in the optical transmission path occur due to aged deterioration and repair of the optical fiber and the like, and a gain tilt of WDM signal light may occur. In such a case, in the optical fiber transmission relay system of the present invention, input power of WDM signal light to the optical repeater on a subsequent stage is properly controlled by the Raman amplification effect by excitation light from an excitation light source. The present invention is mainly characterized in that properly controlling input power of WDM signal light to the optical repeater on the subsequent stage to suppress occurrence of a gain tilt of the optical repeater on the following stages and capable of assuring an excellent optical transmission characteristic in the optical fiber transmission relay system.

(Configuration of First Example Embodiment)

A configuration of an excitation light source apparatus in a first example embodiment according to the present invention will be described with reference to FIG. 1. FIG. 1 is a block configuration diagram illustrating a configuration of an excitation light source apparatus in the present example embodiment. Note that, it is assumed that the excitation light source apparatus 10 illustrated in FIG. 1 is built in a gain equalizing apparatus 100.

The excitation light source apparatus 10 illustrated in FIG. 1 includes at least an excitation light source 1, two band pass filters (BPFs) 2A and 2B, two photo detectors (PDs) 3A and 3B, an excitation light source control circuit 4, a demultiplexer 5, and two wavelength division multiplexing (WDM) multiplexers 6A and 6B. The excitation light source apparatus 10 outputs excitation light for Raman to each of an optical fiber 7A and an optical fiber 7B to amplify WDM signal light (main signal) transmitted through the optical fibers. The optical fiber 7A is an optical fiber that transmits WDM signal light in an upstream (UP) direction. Further, the optical fiber 7B is an optical fiber that transmits WDM signal in a downstream (DW) direction. Note that, in FIG. 1, a circuit unit concerned with a gain equalizing function of compensating for a deviation of a gain wavelength characteristic of input WDM signal light, which is an original function of the gain equalizing apparatus 100, may be identical to that in a conventional technique, and description thereof is omitted herein.

The excitation light source 1 is a light source that outputs excitation light for Raman amplification, namely, excitation light having a wavelength slightly shorter than that of WDM signal light (main signal). The two band pass filters 2A and 2B are filters that extract control signal light for controlling the excitation light source 1 from WDM signal light transmitted through the optical fiber 7A in the UP (upstream) direction and the optical fiber 7B in the DW (downstream) direction. The two photo detectors 3A and 3B are detectors that detect control signal light extracted by the two band pass filters 2A and 2B, respectively, and output control signals obtained by converting the detected control signal light into electric signals.

The excitation light source control circuit 4 is a control circuit that controls the excitation light source 1, based on a control signal from each of the two photo detectors 3A and 3B. The demultiplexer 5 is a circuit that separates excitation light output from the excitation light source 1 into two beams of excitation light that are excitation light for the UP (upstream) direction and excitation light for the DW (downstream) direction. The two WDM multiplexers 6A and 6B are circuits that respectively multiplex WDM signal light (main signal) in the UP (upstream) direction and excitation light for the UP (upstream) direction, and WDM signal light (main signal) in the DW (downstream) direction and excitation light for the DW (downstream) direction.

Herein, the WDM multiplexer 6A is a circuit that multiplexes the WDM signal light (main signal) in the UP (upstream) direction and the excitation light for the UP (upstream) direction in such a way as to direct the WDM signal light and the excitation light in opposite directions. Further, the WDM multiplexer 6B is a circuit that multiplexes the WDM signal light (main signal) in the DW (downstream) direction and the excitation light for the DW (downstream) direction in such a way as to direct the WDM signal light and the excitation light in opposite directions.

In other words, the circuit configuration illustrated in FIG. 1 indicates a case where a backward excitation method that transmits, in a direction opposite to the WDM signal light (main signal), the excitation light for Raman amplification that Raman-amplifies a signal having a wavelength slightly longer than a wavelength of excitation light from the excitation light source 1 is applied. However, a forward excitation method that transmits the excitation light for Raman amplification in the same direction as the WDM signal light (main signal) may be applied instead of the backward excitation.

Figure 2:
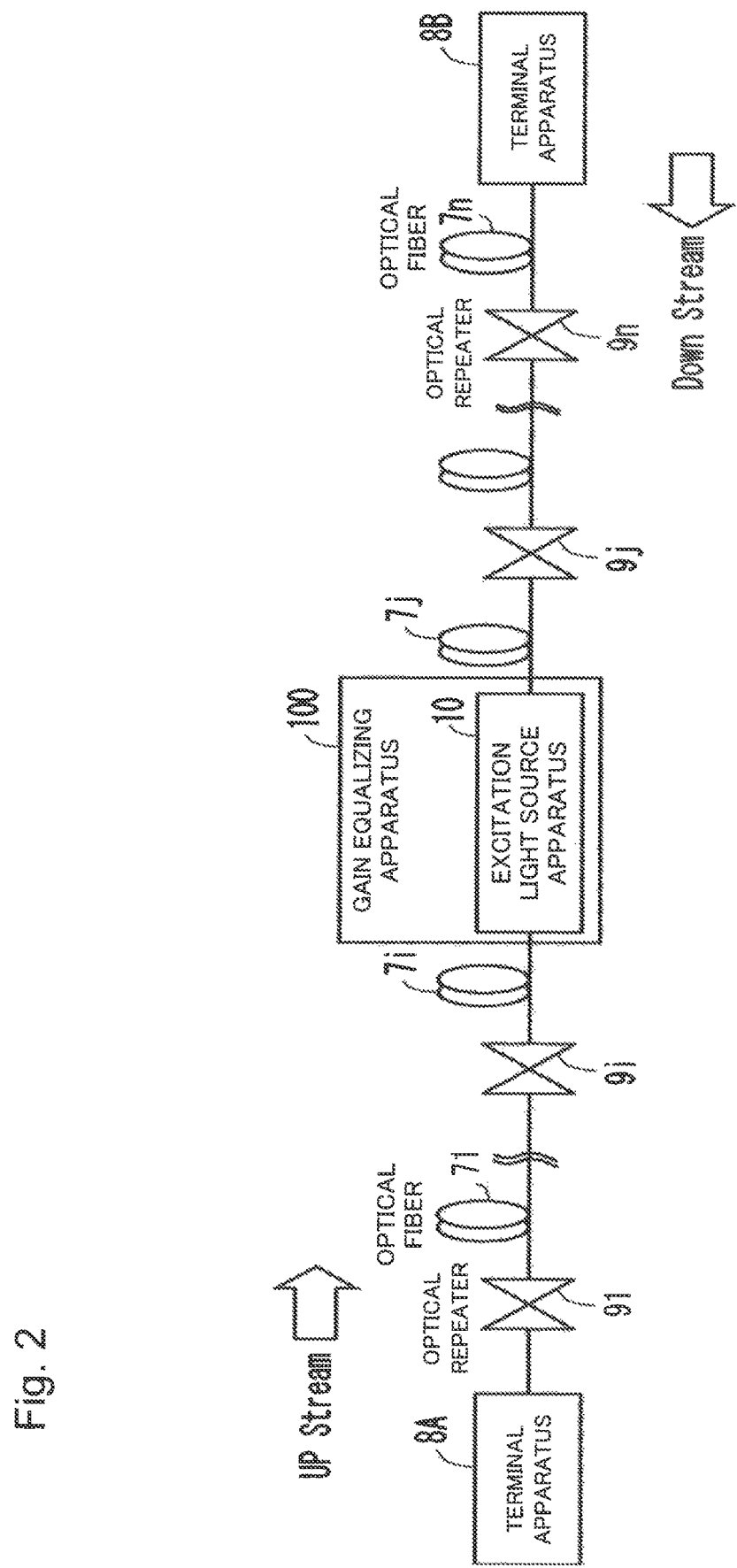
FIG. 2 is a system configuration diagram illustrating one example of an optical fiber transmission relay system including, as one structural component, a gain equalizing apparatus including the excitation light source apparatus illustrated in FIG. 1 built therein.

The excitation light is output from the WDM multiplexer 6A to the optical fiber 7A in the UP (upstream) direction in a direction opposite to the WDM signal light (main signal), and thereby the WDM signal light (main signal) is amplified by the Raman amplification effect in the optical fiber 7A. Further, the excitation light is output from the WDM multiplexer 6B to the optical fiber 7B in the DW (downstream) direction in a direction opposite to the WDM signal light (main signal), and thereby the WDM signal light (main signal) is amplified by the Raman amplification effect in the optical fiber 7B. The WDM signal light (main signal) is amplified in such a manner. Thus, as illustrated in FIG. 2, input power of an optical repeater connected to the following stage of the gain equalizing apparatus 100 including the excitation light source apparatus 10 built therein can be increased via the optical fibers 7A and 7B. As a result, a gain tilt amount of the WDM signal light (main signal) in each of the UP (upstream) direction and the DW (downstream) direction can be adjusted.

FIG. 2 is a system configuration diagram illustrating one example of an optical fiber transmission relay system including, as one structural component, the gain equalizing apparatus 100 including the excitation light source apparatus 10 illustrated in FIG. 1 built therein. The optical fiber transmission relay system illustrated in FIG. 2 may be operated as, for example, a relay system in an optical submarine cable system. Particularly, when the optical fiber transmission relay system is operated as a relay system in an optical submarine cable system, the gain equalizing apparatus 100 including the excitation light source 10 built therein that includes an excitation light source for Raman amplification is disposed in a submarine relay section. In such a configuration, the gain equalizing apparatus 100 including the excitation light source apparatus 10 built therein performs Raman amplification on loss variations on a transmission path of the optical submarine cable by remote control from terminal apparatuses 8A and 8B on land. The gain equalizing apparatus 100 including the excitation light source apparatus 10 built therein performs the Raman amplification in such a manner, and thereby the input power of the optical repeater on the subsequent stage can be appropriately controlled, and occurrence of a gain tilt in the optical repeater on the following stage can be suppressed.

As illustrated in the system configuration diagram in FIG. 2, the optical fiber transmission relay system that performs optical transmission over a long distance between the terminal apparatus 8A and the terminal apparatus 8B includes optical repeaters 91, . . . , 9i, 9j, . . . , and 9n disposed on multiple stages in each of suitable relay sections of optical fibers 71, . . . , 7i, 7j, . . . , and 7n. One or a plurality of gain equalizing apparatuses 100 each including the excitation light source apparatus 10 in FIG. 1 built therein may be disposed as necessary. For example, in the example of FIG. 2, the example in which only one gain equalizing apparatus 100 is connected between the optical fibers 7i and 7j is illustrated.

Note that, as described above, the excitation light source apparatus 10 is installed in the gain equalizing apparatus 100 that compensates for a deviation of a gain wavelength characteristic of input WDM signal light in the present example embodiment. The excitation light source apparatus 10 may be installed in an active gain equalizer (AGEQ) capable of actively compensating for a deviation of a gain wavelength characteristic instead of the configuration above. Alternatively, the excitation light source apparatus 10 may be installed in an optical repeater that amplifies and relays input WDM signal light. Alternatively, the excitation light source apparatus 10 may be individually installed at a suitable place between a gain equalizing apparatus and an optical repeater and individually used for outputting excitation light only with a function of outputting excitation light without having a gain equalizing function and an amplification relay function together.

(Description of Operation in First Example Embodiment)

Next, one example of operations of the excitation light source apparatus 10 built in the gain equalizing apparatus 100 illustrated in FIG. 1 will be described. In a normal optical fiber transmission relay system, input power to an optical repeater on a subsequent stage decreases at occurrence of a loss due to repair and aged deterioration of an optical fiber during operation. As a result, a tilt, namely, a gain tilt occurs in an optical spectrum of wavelength division multiplexing (WDM) signal light output from the optical repeater in the normal optical fiber transmission relay system. When such a gain tilt occurs, a decrease in an optical signal-to-noise ratio (SNR) and a wavelength distortion due to a nonlinear optical effect occur in the WDM signal light (main signal) being transmitted, and an optical transmission characteristic is affected.

However, in the optical fiber transmission relay system in FIG. 2 introducing the gain equalizing apparatus 100 including the excitation light source apparatus 10 illustrated in FIG. 1 built therein, a gain of WDM signal light (main signal) can be equalized, and compensation for and adjustment of a gain tilt can also be performed by using the excitation light source 1 for Raman amplification in FIG. 1.

The excitation light source 1 of the excitation light source apparatus 10 is not working at start of operation of the optical fiber transmission relay system. When the operation of the optical fiber transmission relay system proceeds, a loss increases in a relay section (span) of an optical fiber due to aged deterioration and repair of the optical fiber and the like, and thereby a gain tilt occurs. At a point of time when occurrence of a gain tilt is detected, a control signal for causing the excitation light source 1 of the excitation light source apparatus 10 to work is sent toward the excitation light source apparatus 10 in the gain equalizing apparatus 100.

The excitation light source control circuit 4 of the excitation light source apparatus 10 that has received the control signal controls the excitation light source 1, based on the control signal, and causes excitation light for Raman amplification to be output. The excitation light from the excitation light source 1 is multiplexed with the WDM signal light (main signal) in the upstream direction and the WDM signal light (main signal) in the downstream direction by the respective WDM multiplexers 6A and 6B, and Raman amplification is generated in the optical fibers 7A and 7B. Therefore, input power of the optical repeaters connected to subsequent stages via the optical fibers 7A and 7B is increased, and thereby a gain tilt amount can be adjusted. Herein, as illustrated in FIG. 3, the Raman amplification is a phenomenon in which, when strong excitation light is incident on an optical fiber, stimulated emission based on Raman scattering occurs, and an amplification effect is obtained in a wavelength region longer by approximately 100 nm than a wavelength of the excitation light.

Figure 3:
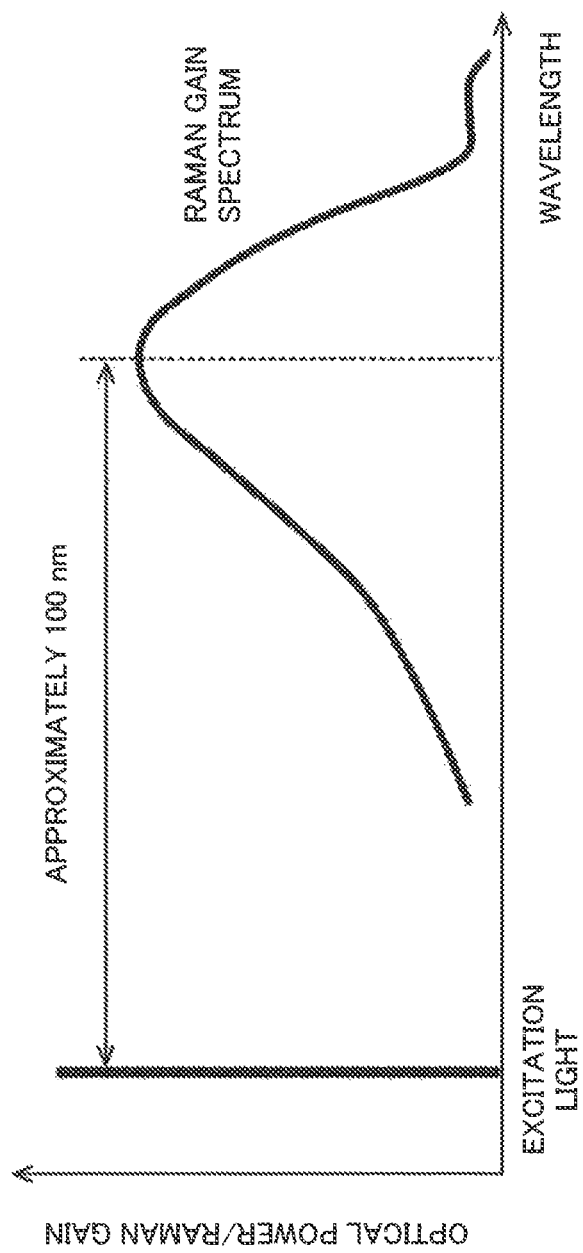
FIG. 3 is a diagram of a characteristic for describing a Raman amplification effect by strong excitation light being incident on an optical fiber.

FIG. 3 is a diagram of a characteristic for describing the Raman amplification effect by strong excitation light being incident on an optical fiber. FIG. 3 illustrates wavelength in a horizontal axis and amount of optical power/Raman gain in a vertical axis. As indicated as a Raman gain spectrum in FIG. 3, a Raman gain of WDM signal light (main signal) peaks in a wavelength region longer by approximately 100 nm than a wavelength of excitation light.

Figure 4:
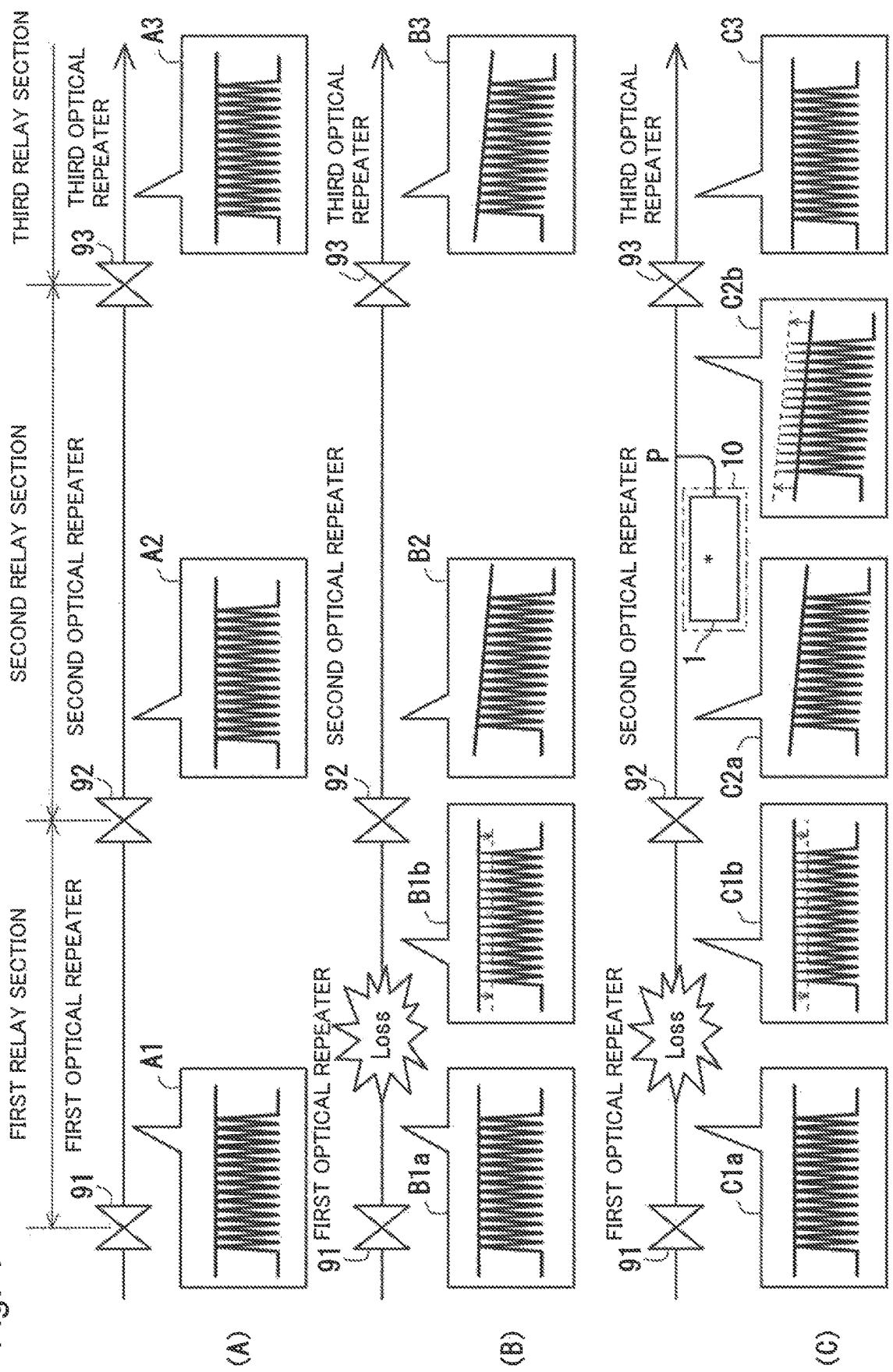
FIG. 4 is a schematic diagram for describing an effect when excitation light is inserted in an optical fiber that transmits WDM signal light.

An effect of inserting excitation light by the excitation light source apparatus 10 will be further described with reference to FIG. 4. FIG. 4 is a schematic diagram for describing an effect when excitation light is inserted by the excitation light source apparatus 10 into an optical fiber that transmits WDM signal light. FIG. 4 schematically illustrates a waveform of WDM signal light output from an optical repeater in each of first, second, and third relay sections in the optical fiber.

(A) of FIG. 4 illustrates a waveform state of WDM signal light immediately after an operation of the optical fiber transmission relay system starts. A gain deviation of the optical fiber does not occur immediately after the operation starts. Therefore, all beams of WDM signal light output from each of a first optical repeater 91, a second optical repeater 92, and a third optical repeater 93 respectively for first, second, and third relay sections have a waveform in a substantially uniform gain state, as indicated by signal waveforms A1, A2, and A3.

(B) of FIG. 4 illustrates a waveform state of WDM signal light in a state where the operation of the optical fiber transmission relay system proceeds, and a loss (LOSS) increases in a first relay section of an optical fiber due to aged deterioration and repair of the optical fiber and the like. The WDM signal light output from the first optical repeater 91 for the first relay section and transmitted through the first relay section has power decreased due to an influence of the increase in loss (LOSS) as indicated from a signal waveform B1a to a signal waveform B1b, and is input to the second optical repeater 92 for the second relay section on the subsequent stage.

Therefore, the second optical repeater 92 for the second relay section increases a gain of an optical amplifier in the second optical repeater 92 to a value higher than an original set value and amplifies the WDM signal light in order to compensate for a shortage of input power due to the loss (LOSS). As a result, a state (a declining state) where the entire signal bandwidth has a gain tilt on a negative side occurs in the WDM signal light output from the second optical repeater 92, as indicated by a signal waveform B2.

The WDM signal light having the gain tilt is transmitted through the second relay section and input to the third optical repeater 93 for the third relay section on the subsequent stage. The WDM signal light output from the third optical repeater 93 for the third relay section is also in the state where the gain is still tilted, as indicated by a signal waveform B3. Thus, also the WDM signal light in the third relay section is transmitted in the state where the gain is still tilted, as indicated by the signal waveform B3. The WDM signal light in which the gain is tilted is in the state where the gain tilt occurs, and thereby deterioration of optical SNR and nonlinear deterioration increase in the WDM signal light after transmission, and deterioration of a transmission characteristic occurs.

(C) of FIG. 4 illustrates a waveform state of WDM signal light when the excitation light source apparatus 10 is disposed at a point P in the second relay section. Note that, as illustrated in (B) of FIG. 4, when a gain tilt occurs and a transmission characteristic is reduced to be less than or equal to a predetermined threshold value, a control signal is sent to the excitation light source apparatus 10, the excitation light source control circuit 4 controls the excitation light source 1, and excitation light for Raman amplification is output, as described above.

Also in the case of (C) of FIG. 4, similarly to the case of (B) of FIG. 4, the WDM signal light transmitted through the first relay section in which the loss (LOSS) is increased is input to the second optical repeater 92 for the second relay section on the subsequent stage while being short of input power, as indicated from a signal waveform C1a to a signal waveform C1b. Thus, similarly to the case of (B) of FIG. 4, the WDM signal light output from the second optical repeater 92 for the second relay section is also output in the state where the entire signal bandwidth has a gain tilt on the negative side, as indicated by a signal waveform C2a.

However, in the case of (C) of FIG. 4, different from the case of (B) of FIG. 4, the WDN signal light is multiplexed with excitation light for Raman amplification output from the excitation light source 1 of the excitation light source apparatus 10 at the point P in the second relay section. Thus, the entire signal bandwidth of the WDM signal light is amplified by the Raman amplification effect in the optical fiber. In the case of (C) of FIG. 4, input power to the third optical repeater 93 for the third relay section on the subsequent stage is amplified to a value slightly higher than an original set value in order to compensate for a loss, as indicated by a signal waveform C2b.

Therefore, the third optical repeater 93 for the third relay section reduces a gain of an optical amplifier in the third optical repeater 93 to a value lower than an original set value and amplifies the WDM signal light in order to adjust output power to preset output power and output the output power. As a result, amplification is performed in a state (an ascending state) where the entire signal bandwidth has a gain tilt on a positive side opposite to that of the output from the second optical repeater 92 in the optical amplifier in the third optical repeater 93. As a result, the WDM signal light output from the third optical repeater 93 is able to return to a flat state without a gain tilt and be output. Therefore, a gain deviation is able to be improved, and thus constancy of an excellent transmission characteristic can be assured.

In other words, input power to an optical repeater (the third optical repeater 93 in the case of (C) of FIG. 4) on a subsequent stage is able to be properly controlled for loss variations in a transmission path by the Raman amplification effect of the excitation light source apparatus 10. Thus, occurrence of a gain tilt in an optical repeater on subsequent stages is able to be suppressed, and an excellent transmission characteristic is able to be constantly assured even after system operation.

Note that, the Raman amplification works differently depending on a positional relationship between a point at which a loss (LOSS) occurs and the point P at which the gain equalizing apparatus 100 including the excitation light source 1 is installed.

For example, in contrast to the case illustrated in (C) of FIG. 4, it is assumed that a point at which the gain equalizing apparatus 100 including the excitation light source 1 is installed is located in the same first relay section as a point at which a loss (LOSS) occurs, and is located between the point at which the loss (LOSS) occurs and the second optical repeater 92 for the second relay section on the subsequent stage. In such a case, the loss (LOSS) that has occurred is compensatable within the first relay section by the Raman amplification effect with the excitation light source, and input power to the second optical repeater 92 for the second relay section on the subsequent stage is able to be in the identical state to that in the case of (A) of FIG. 4. As a result, output from the second optical repeater 92 may also be in the identical state to that in the case of (A) of FIG. 4. Therefore, an influence on the following third optical repeater for the third relay section is able to be eliminated.

The circuit configuration in which the excitation light for Raman amplification propagates in the direction opposite to the WDM signal light (main signal) being an amplification target (that is, backward excitation Raman amplification is performed) in the excitation light source apparatus 10 illustrated in FIG. 1 has been described. As described above, it is needless to say that an apparatus configuration in which the excitation light for Raman amplification and the WDM signal light (main signal) being an amplification target propagate in the same direction (that is, forward excitation Raman amplification is preformed) may be used in the present example embodiment. Further, the excitation light source that outputs the excitation light for Raman amplification may not be limited to one as in the example illustrated in FIG. 1, and a configuration in which a plurality of excitation light sources are installed may also be used.

Second Example Embodiment

Figure 5:
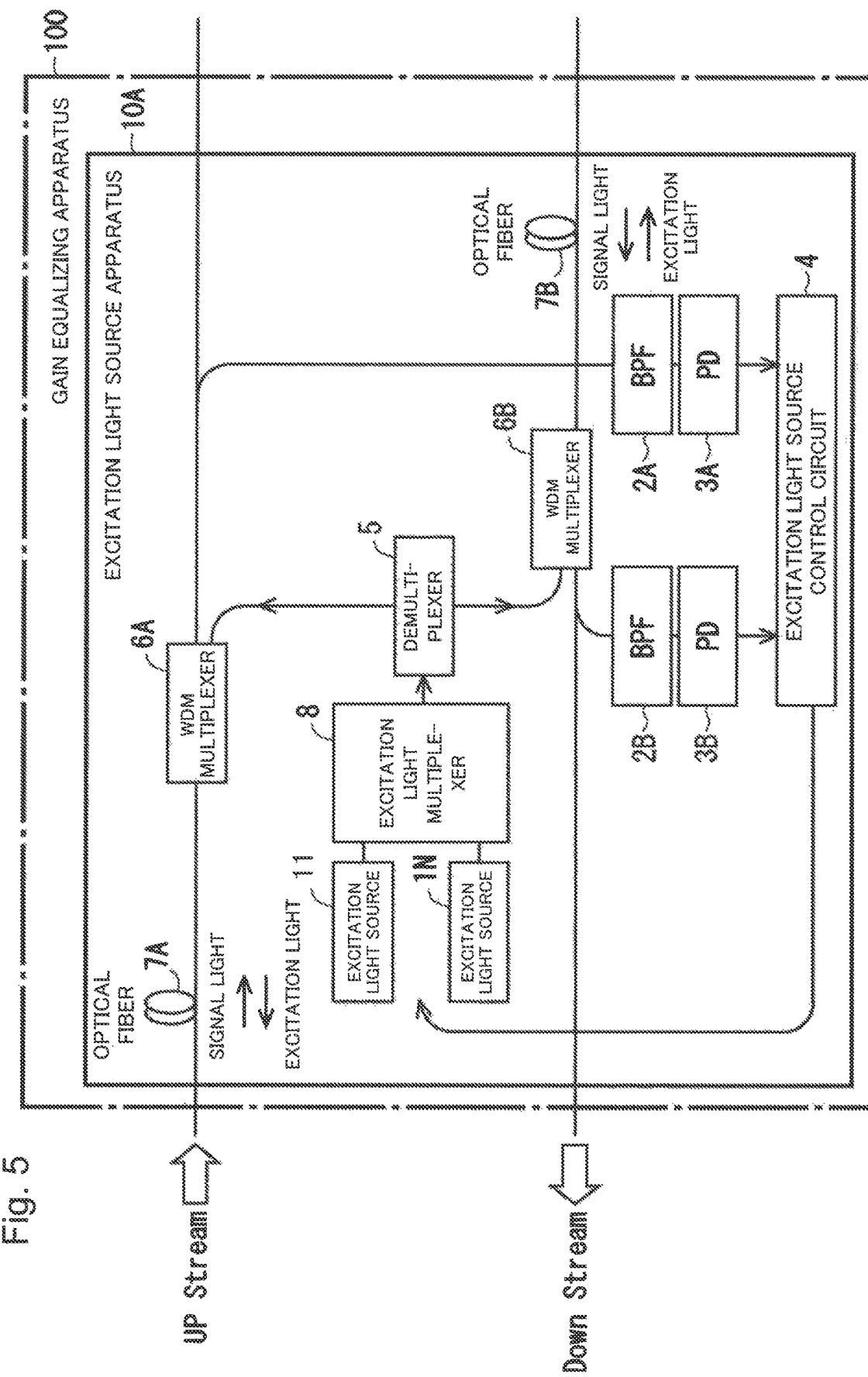
FIG. 5 is a block configuration diagram illustrating a configuration of an excitation light source apparatus in a second example embodiment of the present invention.

A second example embodiment of the present invention will be described with reference to FIG. 5. FIG. 5 is a block configuration diagram illustrating a configuration of an excitation light source apparatus in the present example embodiment. FIG. 5 illustrates a case where an excitation light source apparatus 10A illustrated in FIG. 5 is installed in a gain equalizing apparatus 100, similarly to the case of FIG. 1, and N (N: integer of two or more) excitation light sources that output excitation light for Raman amplification are installed in contrast to the excitation light source apparatus 10 in FIG. 1.

In other words, the excitation light source apparatus 10A illustrated in FIG. 5 includes N excitation light sources 11, . . . , and IN that output beams of excitation light having different wavelengths instead of one excitation light source 1 in the excitation light source apparatus 10 in FIG. 1. Further, the excitation light source apparatus 10A illustrated in FIG. 5 has a configuration in which an excitation light multiplexer 8 that multiplexes beams of excitation light output from each of the N excitation light sources 11, . . . , and IN and outputs the excitation light to a demultiplexer 5 is added to the excitation light source apparatus 10 in FIG. 1. Note that, an excitation light source control circuit 4 is configured to be able to control the N excitation light sources 11, . . . , and IN separately, based on a control signal from each of two photo detectors 3A and 3B.

Generally, when Raman amplification is performed, an amount of frequency shift (namely, an amount of wavelength shift) of excitation light energy at a time of stimulated Raman scattering being caused is determined depending on a material of an optical fiber being a medium in the Raman amplification. Therefore, the plurality of excitation light sources 11 that output beams of excitation light having wavelengths are installed by adopting the apparatus configuration of the excitation light source apparatus 10A in FIG. 5, and thereby proper adjustment of a gain tilt to WDM signal light (main signal) and level correction of only a part of a wavelength bandwidth of the WDM signal light (main signal) is able to be achieved. In other words, the plurality of excitation light sources 11, . . . , and 1N that output beams of excitation light having different wavelengths are previously installed and are separately controlled via the excitation light source control circuit 4, and thereby proper adjustment of a gain tilt to the WDM signal light (main signal) is able to be achieved. Further, the plurality of excitation light sources 11, . . . , and 1N that output beams of excitation light having different wavelengths are installed and are separately controlled via the excitation light source control circuit 4, and thereby level correction of only a part of a wavelength bandwidth of the WDM signal light (main signal) is also able to be achieved.

Figure 6:
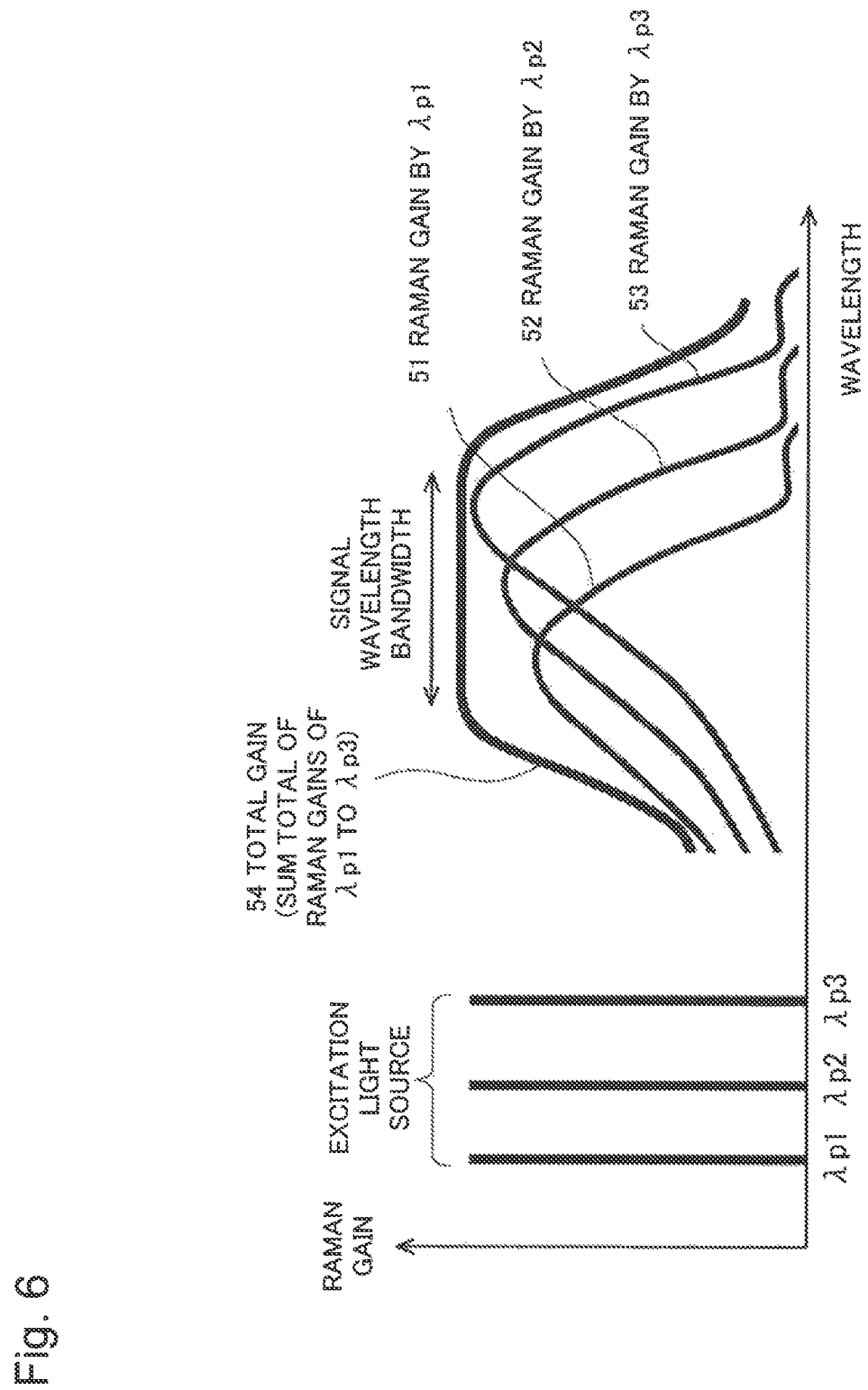
FIG. 6 is a diagram of a characteristic for describing a principle of the Raman amplification effect in the excitation light source apparatus in FIG. 5.

For example, by using a case where the number of excitation light sources 11, . . . , and 1N that output beams of excitation light having different wavelengths is three, a principle of the Raman gain effect in the excitation light source apparatus 10A in FIG. 5 will be further described by using FIG. 6. FIG. 6 is a diagram of a characteristic for describing the principle of the Raman amplification effect in the excitation light source apparatus 10A in FIG. 5, and indicates wavelength in a horizontal axis and optical power amount/Raman gain in a vertical axis.

As illustrated in FIG. 6, three excitation light sources output beams of excitation light having wavelengths in increasing order of length of wavelengths kp1, kp2, and kp3. The beams of the excitation light having the three wavelengths cause amplification effects of a Raman gain 51, a Raman gain 52, and a Raman gain 53 as Raman gain spectra according to the respective wavelengths kp1, kp2, and kp3 in a wavelength region longer by approximately 100 nm than each of the beams of the excitation light. Therefore, an amount of amplification concerned with a signal wavelength bandwidth indicated by a thick curved line in FIG. 6 is obtained as a total gain 54 by the excitation light having the three wavelengths (namely, a sum total of Raman gains by the beams of the excitation light having the wavelengths kp1, kp2, and kp3).

Figure 7:
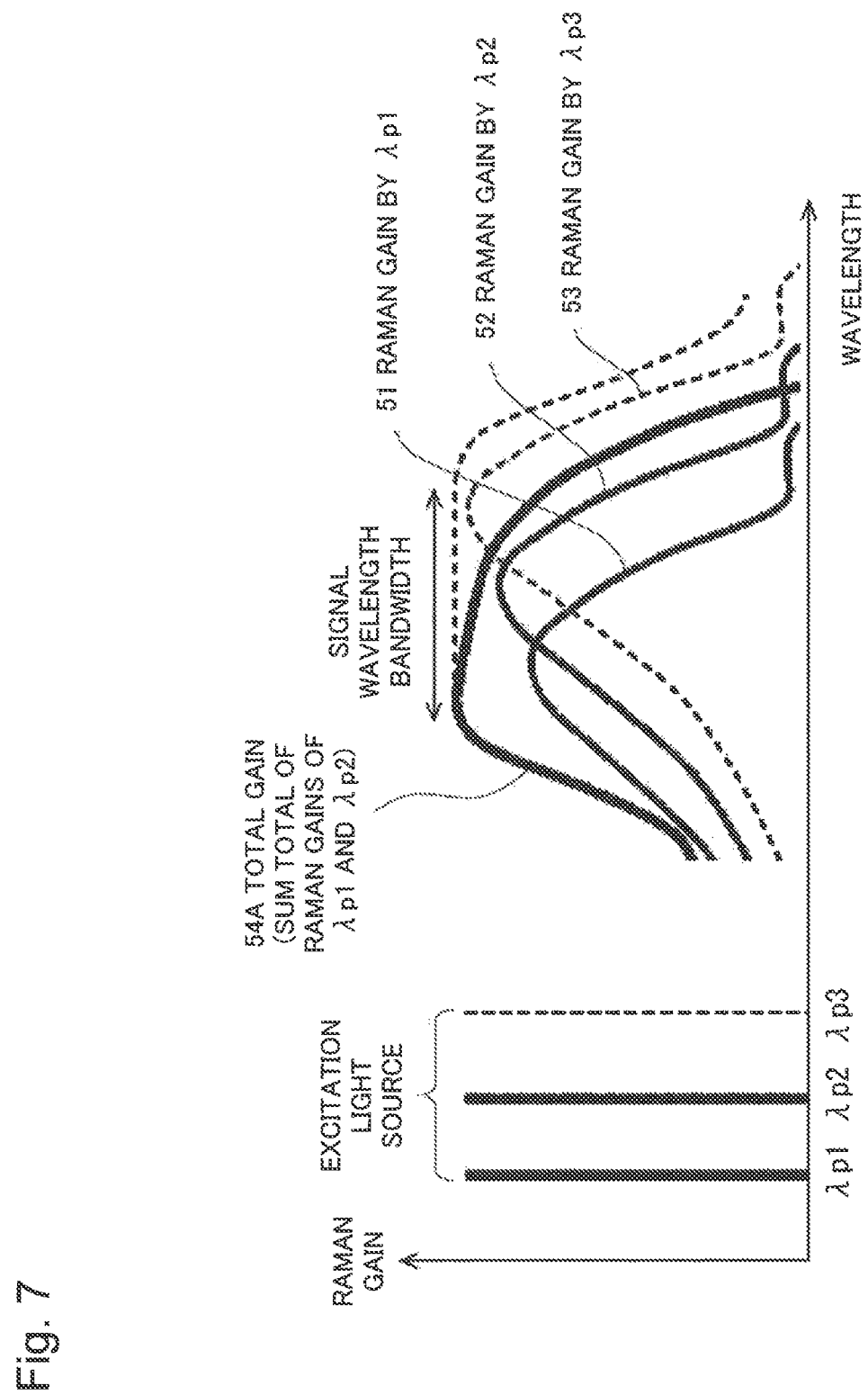
FIG. 7 is a diagram of a characteristic illustrating a control example of the Raman amplification effect in the excitation light source apparatus in FIG. 5.

In the case where the three excitation light sources are being used, Raman amplification is performed as follows when Raman amplification concerned with a signal wavelength bandwidth on a short wavelength side other than a long wavelength side as an amount of amplification, for example, is desired to be performed. When the Raman amplification is desired to be performed on the short wavelength side, a control signal instructing to select and amplify the beams of the excitation light having the two wavelengths on the short wavelength side except for the wavelength kp3 being the longest wavelength, namely, the beams of the excitation light having the wavelengths kp1 and kp2 may be sent to the excitation light source control circuit 4 in the excitation light source apparatus 10A. As a result, an amount of amplification concerned with a signal wavelength bandwidth indicated by a thick curved line as a total gain 54A in FIG. 7 is obtained. FIG. 7 is a diagram of a characteristic illustrating a control example of the Raman amplification effect in the excitation light source apparatus 10A in FIG. 5, and illustrates, as one example, a case where a signal wavelength bandwidth on a short wavelength side other than a long wavelength side is Raman-amplified.

In other words, in FIG. 7, as indicated by broken lines, the beams of the excitation light having the two wavelengths kp1 and kp2 on the short wavelength side are output without outputting the excitation light having the longest wavelength kp3. In FIG. 7, an amount of amplification on the short wavelength side increases and the amount of amplification concerned with the signal wavelength bandwidth as indicated by the thick curved line is obtained as the total gain 54A by the beams of the excitation light having the two wavelengths on the short wavelength side (namely, a sum total of Raman gains by the beams of the excitation light having the wavelengths kp1 and kp2). Thus, the plurality of excitation light sources 11, . . . , and 1N that output beams of excitation light having different wavelengths are individually selected and controlled, and thereby a Raman gain is able to be finely adjusted for each signal wavelength bandwidth, and a gain adjustment to a gain tilt is able to be achieved more accurately.

Third Example Embodiment

Figure 8:
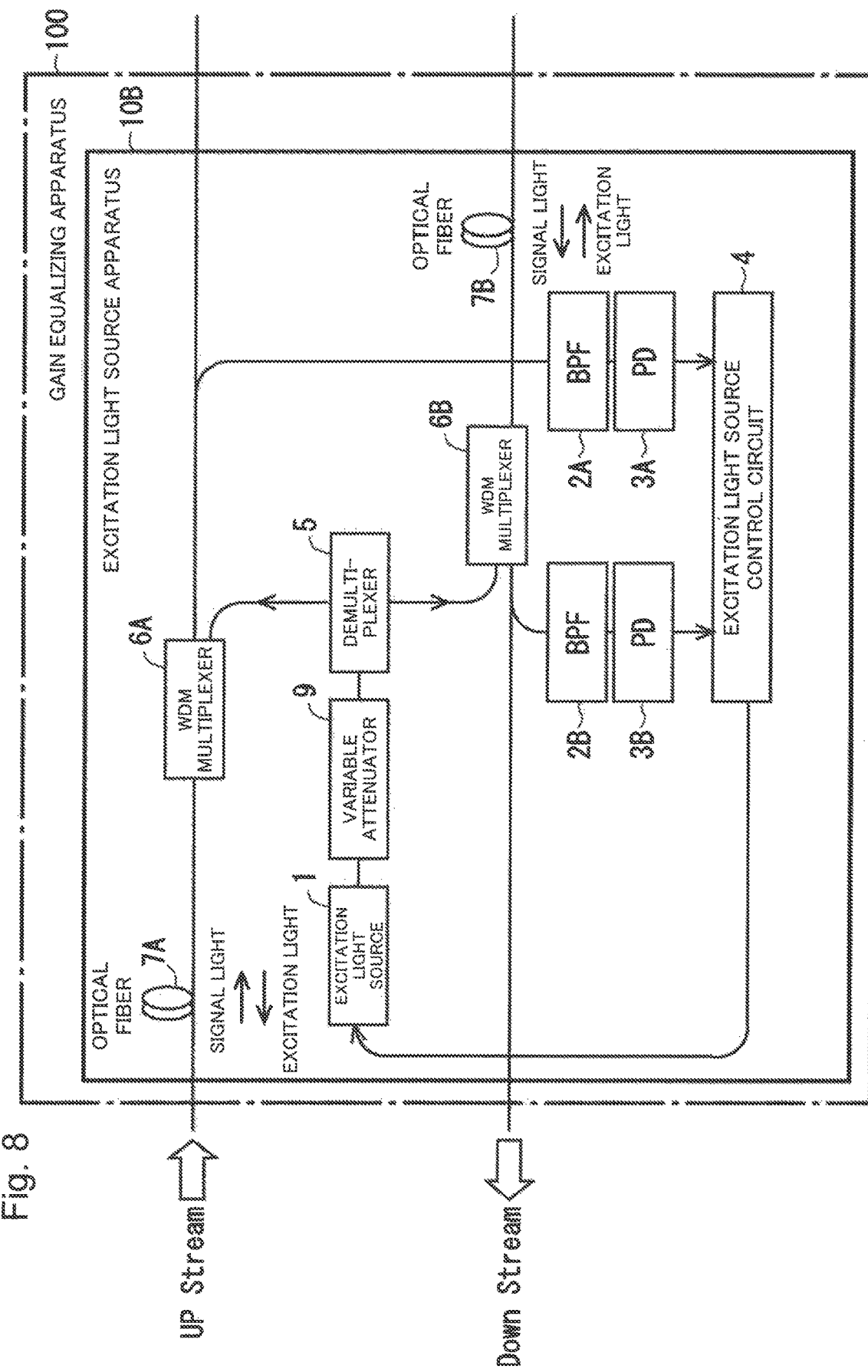
FIG. 8 is a block configuration diagram illustrating a configuration of an excitation light source apparatus in a third example embodiment of the present invention.

Next, an example of a configuration of an excitation light source apparatus further different from that in FIGS. 1 and 5 will be described as a third example embodiment with reference to FIG. 8. FIG. 8 is a block configuration diagram illustrating a configuration of an excitation light source apparatus according to the present example embodiment. An excitation light source apparatus 10B illustrated in FIG. 8 is, similarly to that in FIG. 1, installed in a gain equalizing apparatus 100. Further, the excitation light source apparatus 10B is different from the excitation light source apparatus 10 in FIG. 1 and additionally includes, on a subsequent stage of an excitation light source 1 that outputs excitation light for Raman amplification, a variable attenuator 9 that attenuates a power level of excitation light by control from an excitation light source control circuit 4 in a variable manner and outputs the excitation light to a demultiplexer 5.

In the excitation light source apparatus 10B illustrated in FIG. 8, the variable attenuator 9 is additionally installed, and thereby a power level of excitation light for Raman amplification output from the excitation light source 1 is able to be adjusted finely and actively. Thus, in the excitation light source apparatus 10B in the present example embodiment, an amount of Raman amplification for WDM signal light (main signal) may be more finely adjusted, and a gain adjustment to a gain tilt is able to be achieved more accurately.

Fourth Example Embodiment

Figure 9:
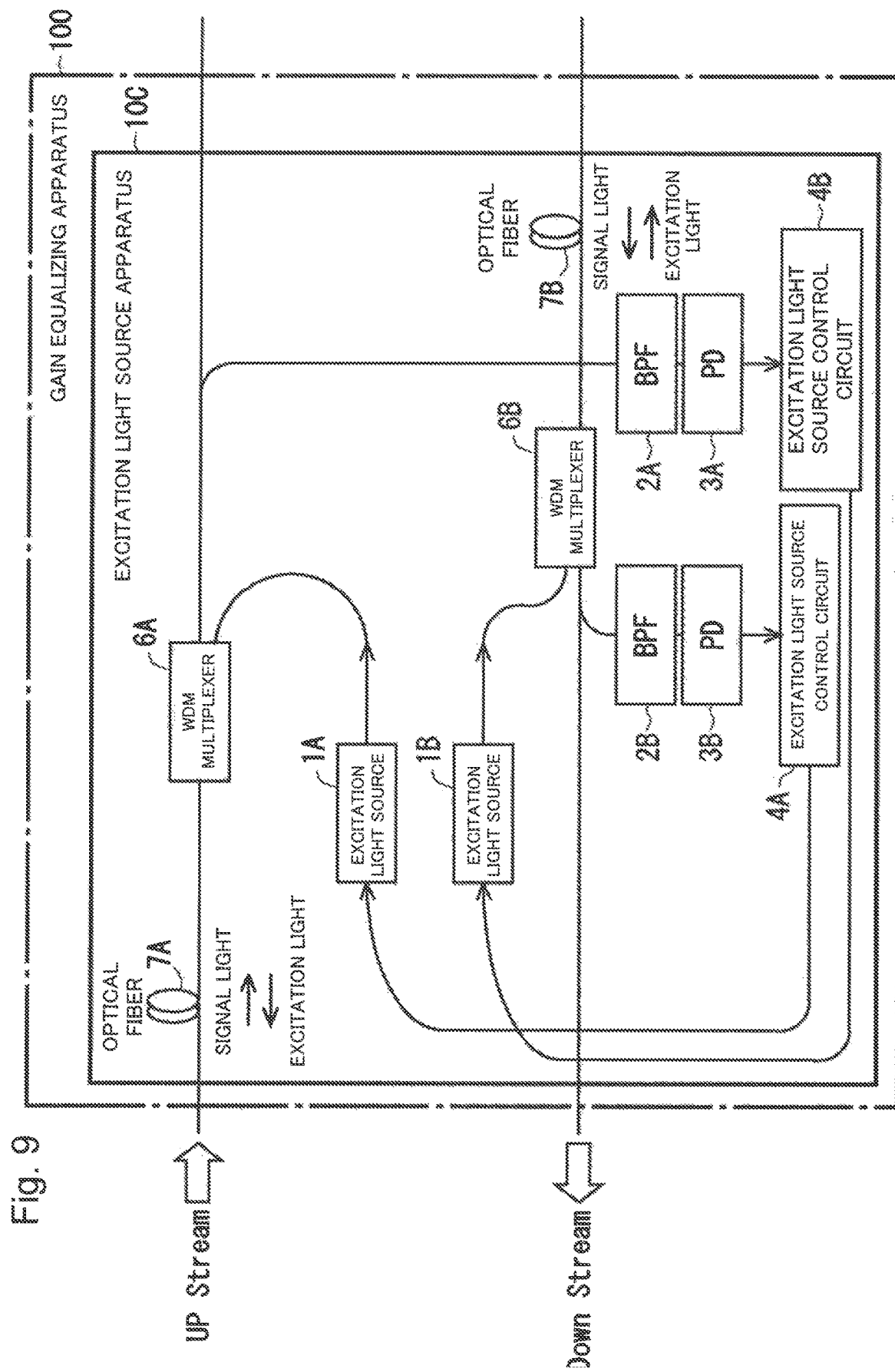
FIG. 9 is a block configuration diagram illustrating a configuration of an excitation light source apparatus in a fourth example embodiment of the present invention.

Next, an example of a configuration of an excitation light source apparatus further different from that in FIGS. 1, 5, and 8 will be described as a fourth example embodiment with reference to FIG. 9. FIG. 9 is a block configuration diagram illustrating a configuration of an excitation light source apparatus according to the present example embodiment. An excitation light source apparatus 10C illustrated in FIG. 9 is, similarly to that in FIG. 1, installed in a gain equalizing apparatus 100. The excitation light source apparatus 10C illustrated in FIG. 9 is different from the excitation light source apparatus 10 in FIG. 1 and does not share an excitation light source 1 that outputs excitation light for Raman amplification in an upstream (UP) direction and a downstream (DW) direction. In other words, the excitation light source apparatus 10C illustrated in FIG. 9 includes separate excitation light sources independently in the upstream (UP) direction and the downstream (DW) direction.

In other words, the excitation light source apparatus 10C illustrated in FIG. 9 includes two excitation light sources as an excitation light source 1A and an excitation light source 1B independently in the upstream (UP) direction and the downstream (DW) direction instead of the one excitation light source 1 in the excitation light source apparatus 10 in FIG. 1. Further, the demultiplexer 5 in the excitation light source apparatus 10 in FIG. 1 is eliminated from the excitation light source apparatus 10C illustrated in FIG. 9. In the excitation light source apparatus 10C illustrated in FIG. 9, beams of excitation light output from the excitation light source 1A and the excitation light source 1B are directly connected to a WDM multiplexer 6A and a WDM multiplexer 6B respectively in the upstream (UP) direction and the downstream (DW) direction.

Note that, the excitation light source apparatus 10C illustrated in FIG. 9 has a configuration that enables to independently control the excitation light source 1A and the excitation light source 1B respectively in the upstream (UP) direction and the downstream (DW) direction. In other words, the excitation light source apparatus 10C illustrated in FIG. 9 is configured such that the excitation light source control circuit 4 in FIG. 1 is separately installed as an excitation light source control circuit 4A for the upstream (UP) direction and an excitation light source control circuit 4B for the downstream (DW) direction.

The excitation light source apparatus 10C illustrated in FIG. 9 is able to independently control the excitation light source 1A and the excitation light source 1B respectively in the upstream (UP) direction and the downstream (DW) direction. Thus, an amount of Raman amplification for WDM signal light (main signal) is able to be more finely adjusted in the upstream (UP) direction and the downstream (DW) direction, and a gain adjustment to a gain tilt may be achieved more accurately. Furthermore, ON and OFF of excitation light may also be set separately for the upstream (UP) direction and the downstream (DW) direction.

Fifth Example Embodiment

Figure 10:
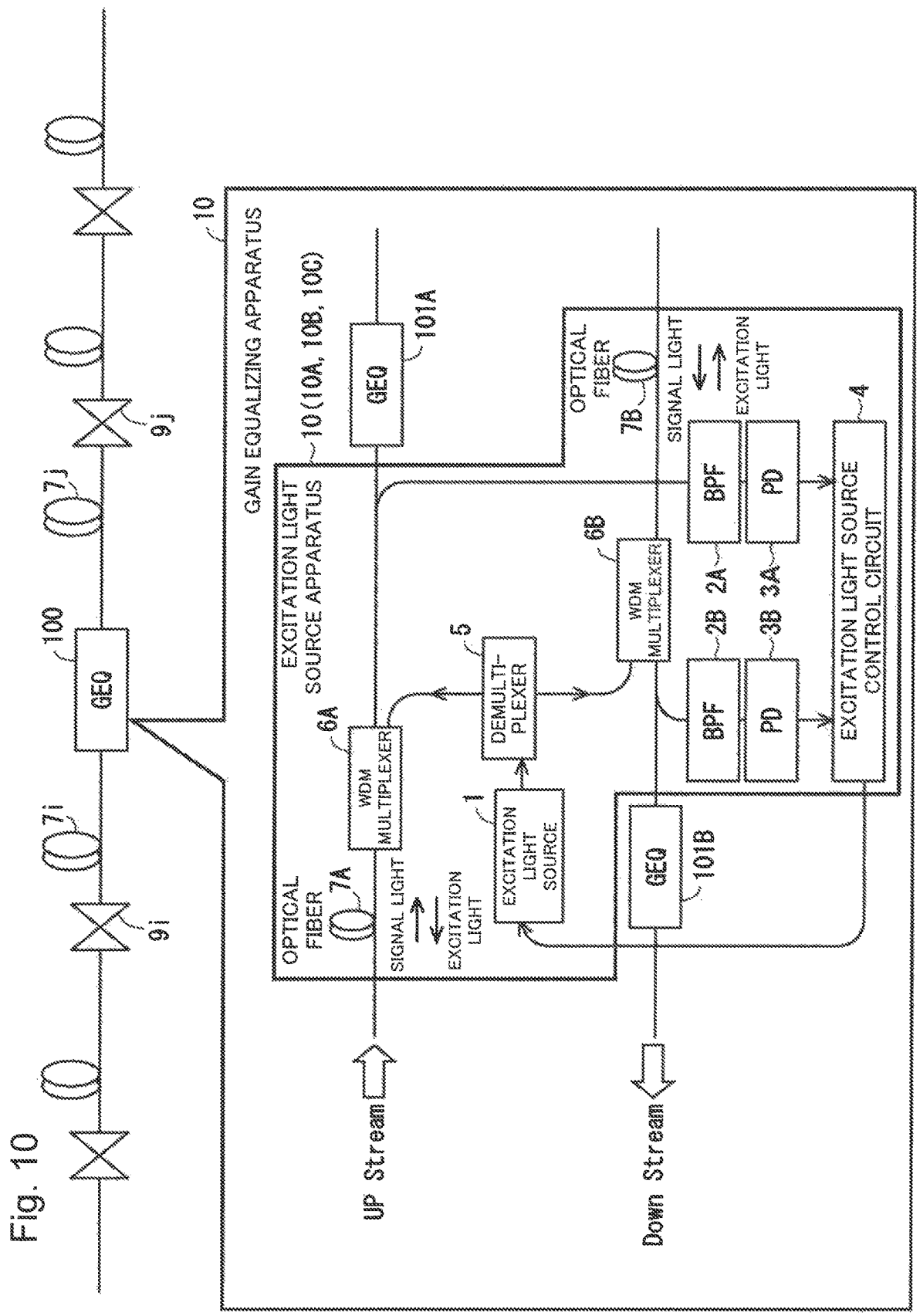
FIG. 10 is a schematic diagram illustrating one example of a relay section in which an excitation light source for Raman amplification is inserted in an optical fiber in an optical fiber transmission relay system.

In each of the example embodiments above, the cases where the excitation light source apparatuses 10, 10A, 10B, and 10C are respectively installed while being built in the gain equalizing apparatus 100 have been described as above. Therefore, as illustrated in FIG. 10, in all of the cases, an insertion position in an optical fiber of an excitation light source for Raman amplification in an optical fiber transmission relay system is a relay section in which the gain equalizing apparatus 100 including the excitation light source apparatuses 10, 10A, 10B, and 10C built therein is installed. In other words, the insertion position in the optical fiber of the excitation light source for Raman amplification is a gain equalizer (GEQ) span being the relay section in which the gain equalizing apparatus 100 is installed.

FIG. 10 is a schematic diagram illustrating one example of a relay section in which an excitation light source for Raman amplification is inserted in an optical fiber in an optical fiber transmission relay system. As illustrated in FIG. 10, all of the excitation light source apparatuses 10, 10A, 10B, and 10C each including the excitation light source for Raman amplification are built in the gain equalizing apparatus 100 including a gain equalizing circuit 101A for the upstream (UP) channel and a gain equalizing circuit 101B for the downstream (DW) channel. Therefore, the excitation light source for Raman amplification is inserted in the relay section (relay section between an optical repeater 9$i$ and an optical repeater 9$j$ in FIG. 10) on the optical fiber in which the gain equalizing circuit 100 is inserted. Note that, FIG. 10 exemplifies the case of the excitation light source apparatus 10 illustrated in FIG. 1 as a circuit configuration of an excitation light source apparatus built in the gain equalizing apparatus 100. The same applies to a case where the excitation light source apparatuses 10A, 10B, and 10C in FIGS. 5, 8, and 9 are each used as an excitation light source apparatus built in the gain equalizing apparatus 100, instead of the excitation light source apparatus 10 illustrated in FIG. 1.

Figure 11:
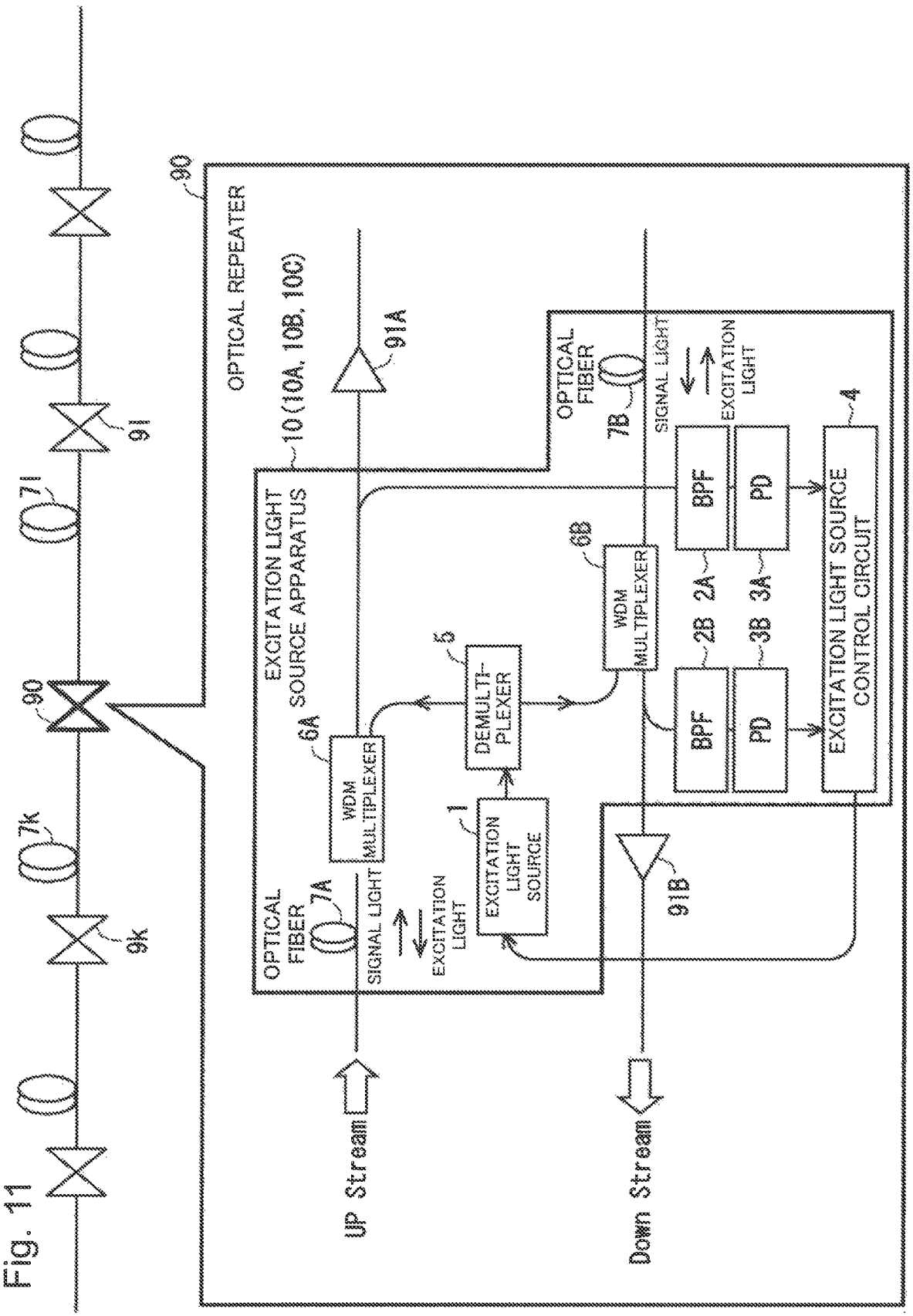
FIG. 11 is a schematic diagram illustrating an example different from FIG. 10 of a relay section in which the excitation light source for Raman amplification is inserted in the optical fiber in the optical fiber transmission relay system.

Further, the excitation light source apparatuses 10, 10A, 10B, and 10C may be installed while being built in an optical repeater instead of the gain equalizing apparatus 100. The excitation light source apparatuses 10, 10A, 10B, and 10C are built in an optical repeater, and thereby, as illustrated in FIG. 11, in all of the cases, an insertion position in an optical fiber of an excitation light source for Raman amplification in an optical fiber transmission relay system is a relay section in which an optical repeater 90 is installed. In other words, in FIG. 11, the insertion position in the optical fiber of the excitation light source for Raman amplification is an optical repeater span in which the optical repeater 90 including the excitation light source apparatuses 10, 10A, 10B, and 10C built therein is installed.

FIG. 11 is a schematic diagram illustrating an example different from FIG. 10 of a relay section in which the excitation light source for Raman amplification is inserted in the optical fiber in the optical fiber transmission relay system, and illustrates a case where the excitation light source for Raman amplification is inserted in a position identical to a position in which an optical repeater is inserted. As illustrated in FIG. 11, all of the excitation light source apparatuses 10, 10A, 10B, and 10C each including the excitation light source for Raman amplification are built in the optical repeater 90 including an optical amplifier 91A for the upstream (UP) channel and an optical amplifier 91B for the downstream (DW) channel. Therefore, the excitation light source for Raman amplification is inserted in the relay section (relay section between an optical repeater 9$k$ and an optical repeater 91 in FIG. 11) on the optical fiber in which the optical repeater 90 is inserted. Note that, FIG. 11 also exemplifies the case of the excitation light source apparatus 10 illustrated in FIG. 1 as a circuit configuration of an excitation light source apparatus built in the optical repeater 90, but the same applies to cases of the excitation light source apparatuses 10A, 10B, and 10C in FIGS. 5, 8, and 9.

Sixth Example Embodiment

Figure 12:
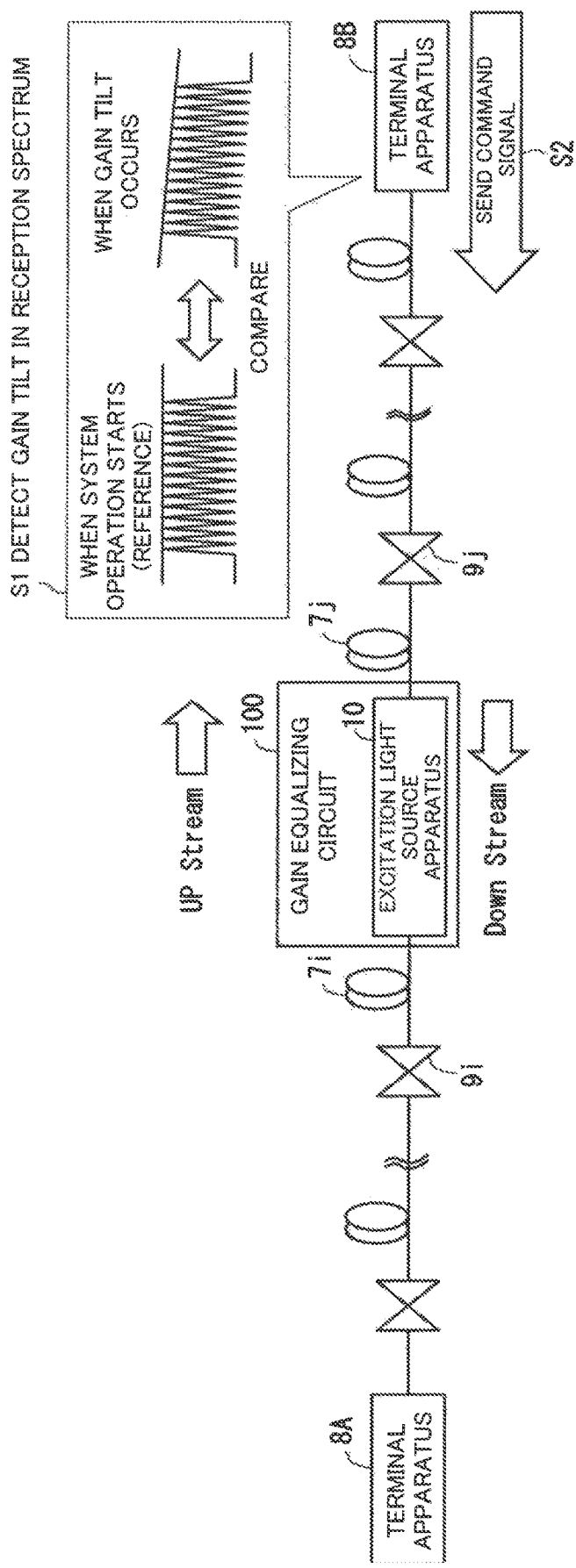
FIG. 12 is a schematic diagram for describing a principle of an operation for remotely controlling the excitation light source apparatus inserted in the optical fiber from a terminal apparatus in the optical fiber transmission relay system.

As described above, in all the cases of the excitation light source apparatuses 10, 10B, (10C, and 10A), the excitation light source 1, (1A, 1B, 11, . . . , and 1N) for Raman amplification are controlled by the excitation light source control circuit 4(4A, and 4B), based on control information sent via the optical fiber. As illustrated in FIG. 12, in all the cases of the excitation light source apparatuses 10, 10B, (10C, and 10A), the excitation light source apparatus 10, (10A, 10B, and 10C) is remotely controllable from a terminal apparatus installed at an end of the optical fiber transmission relay system.

FIG. 12 is a schematic diagram for describing a principle of an operation for remotely controlling the excitation light source apparatus inserted in the optical fiber from a terminal apparatus in the optical fiber transmission relay system. A system configuration is identical to the configuration described above in FIG. 2. Such remote control from a terminal apparatus is particularly necessary when the optical fiber transmission relay system is operated as a relay system in an optical submarine cable system. In other words, for a relay system in an optical submarine cable system, as illustrated in FIG. 12, the gain equalizing apparatus 100 including the excitation light source apparatus 10 built therein is installed in the relay section between the optical repeater 9$i$ and the optical repeater 9$j$ of the optical fiber provided on the bottom of the sea. In this case, the gain equalizing apparatus 100 is an active gain equalizer (AGEQ) capable of actively compensating for a deviation of a gain wavelength characteristic. Therefore, it is essential to remotely control the excitation light source apparatus 10 on the bottom of the sea from a terminal apparatus installed on land, such as a terminal apparatus 8B installed in the upstream (UP) direction of the excitation light source apparatus 10.

As illustrated in FIG. 12, the terminal apparatus 8B monitors transmission quality of WDM signal light transmitted from the optical fiber in the upstream (UP) direction at all times. When detecting that deterioration of the transmission quality due to an increase in a gain tilt in an optical fiber transmission path as a reception spectrum exceeds a predetermined threshold value and occurs (Step S1), the terminal apparatus 8B calculates a power level of excitation light for Raman amplification needed to eliminate the gain tilt. When the power level of the excitation light is calculated, the terminal apparatus 8B generates a command signal (control signal) for controlling an excitation light source including information about the power level, and sends the command signal to the corresponding excitation light source apparatus 10 via the optical fiber in the downstream (DW) direction (Step S2).

In the excitation light source apparatus 10, the command signal (control signal) sent from the terminal apparatus 8B is delivered to the excitation light source control circuit 4 via the band pass filter 2B and the photo detector 3B, as described above. The excitation light source control circuit 4 starts the excitation light source 1, based on the sent command signal (control signal), and outputs excitation light for Raman amplification at a designated power level. As a result, input power of the optical repeater 9$i$ connected to a subsequent stage via an optical fiber 7$i$ is increased, and thereby a gain tilt amount is able to be adjusted.

Seventh Example Embodiment

Figure 13:
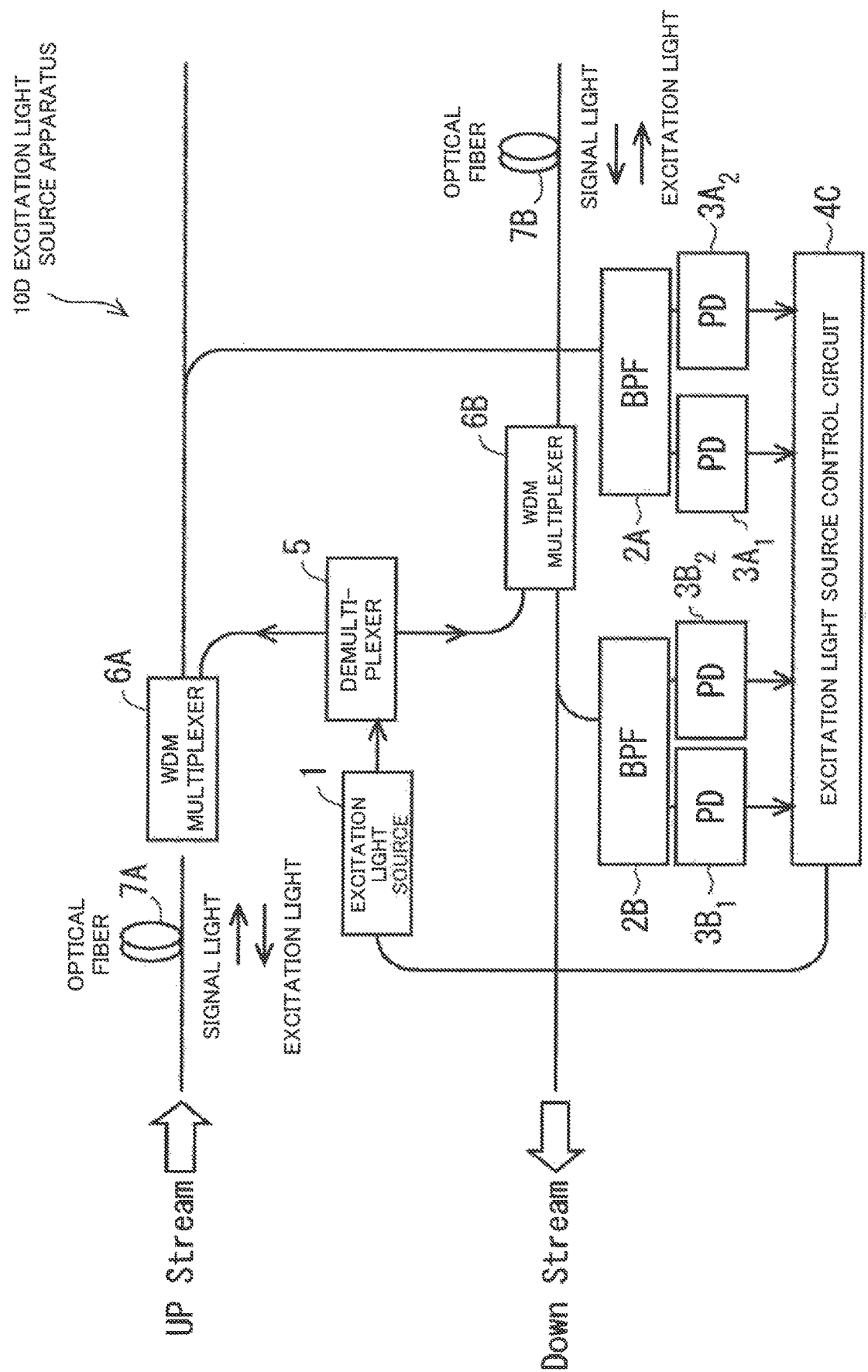
FIG. 13 is a block configuration diagram illustrating a configuration of an excitation light source apparatus in a seventh example embodiment of the present invention.

In the configuration example illustrated in FIG. 12, the terminal apparatus 8B detects an increase in a gain tilt in the optical fiber transmission path, and starts the excitation light source by remote control, based on a detection result and also controls a power level of excitation light output from the excitation light source by remote control. Instead of such a configuration, the excitation light source apparatus itself may be configured to autonomously detect an increase in a gain tilt and automatically control the excitation light source, based on a detection result. FIG. 13 is a block configuration diagram illustrating a configuration of an excitation light source apparatus according to the present example embodiment, and illustrates an example of a configuration that automatically controls an excitation light source. Note that, an excitation light source apparatus 10D illustrated in FIG. 13 is illustrated as an independent apparatus, but may be certainly built in the gain equalizing apparatus 100 or the optical repeater 90 as described in FIGS. 10 and 11.

The excitation light source apparatus 10D illustrated in FIG. 13 is modified from the configuration of the excitation light source apparatus 10 in FIG. 1 in which one photo detector 3A for the upstream (UP) direction and one photo detector 3B for the downstream (DW) direction are installed. In other words, in the excitation light source apparatus 10D illustrated in FIG. 13, photo detectors $3A_1$ and $3A_2$ and photo detectors $3B_1$ and $3B_2$ are installed respectively in the upstream (UP) direction and the downstream (DW) direction. Further, the configuration of the excitation light source control circuit 4 in the excitation light source apparatus 10 in FIG. 1 is modified in the excitation light source apparatus 10D illustrated in FIG. 13. In other words, the excitation light source apparatus 10D illustrated in FIG. 13 includes an excitation light source control circuit 4C including a function of automatically controlling an excitation light source 1. The excitation light source control circuit 4C automatically controls the excitation light source 1, based on a comparison result between outputs of both of the photo detectors $3A_1$ and $3A_2$ in the upstream (UP) direction and a comparison result between outputs of both of the photo detectors $3B_1$ and $3B_2$ in the downstream (DW) direction.

In other words, both of the photo detectors $3A_1$ and $3A_2$ for the upstream (UP) direction detect power levels on the shortest wavelength side and the longest wavelength side of WDM signal light (main signal) in the upstream (UP) direction, and output a detection result to the excitation light source control circuit 4C. Further, both of the photo detectors $3B_1$ and $3B_2$ for the downstream (DW) direction detect power levels on the shortest wavelength side and the longest wavelength side of WDM signal light (main signal) in the downstream (UP) direction, and output a detection result to the excitation light source control circuit 4C. The excitation light source control circuit 4C monitors changes in power level on the shortest wavelength side and the longest wavelength side of WDM signal light (main signal) in each of the upstream (UP) direction and the downstream (DW) direction and compares the changes. The excitation light source control circuit 4C detects whether or not a level deviation (tilt increase) of WDM signal light (main signal) occurs and a gain tilt of the WDM signal light (main signal) occurs, based on a comparison result of the changes in the power level.

When the excitation light source control circuit 4C detects that a gain tilt of the WDM signal light (main signal) occurs, the excitation light source control circuit 4C calculates a power level of excitation light for Raman amplification needed to eliminate the gain tilt, starts the excitation light source 1, and outputs excitation light at a designated power level. As a result, input power of an optical repeater connected to a subsequent stage via an optical fiber is increased, and thereby a gain tilt amount can be automatically adjusted. Therefore, a gain tilt can be automatically adjusted even in a situation such as an increase in loss (LOSS) due to repair and aged deterioration of the optical fiber, and such a situation can be easily handled.

Eighth Example Embodiment

Next, an example of a configuration different from that in FIG. 13 will be described as a configuration in which an excitation light source apparatus itself autonomously detects an increase in a gain tilt and automatically controls an excitation light source, based on a detection result.

Figure 14:
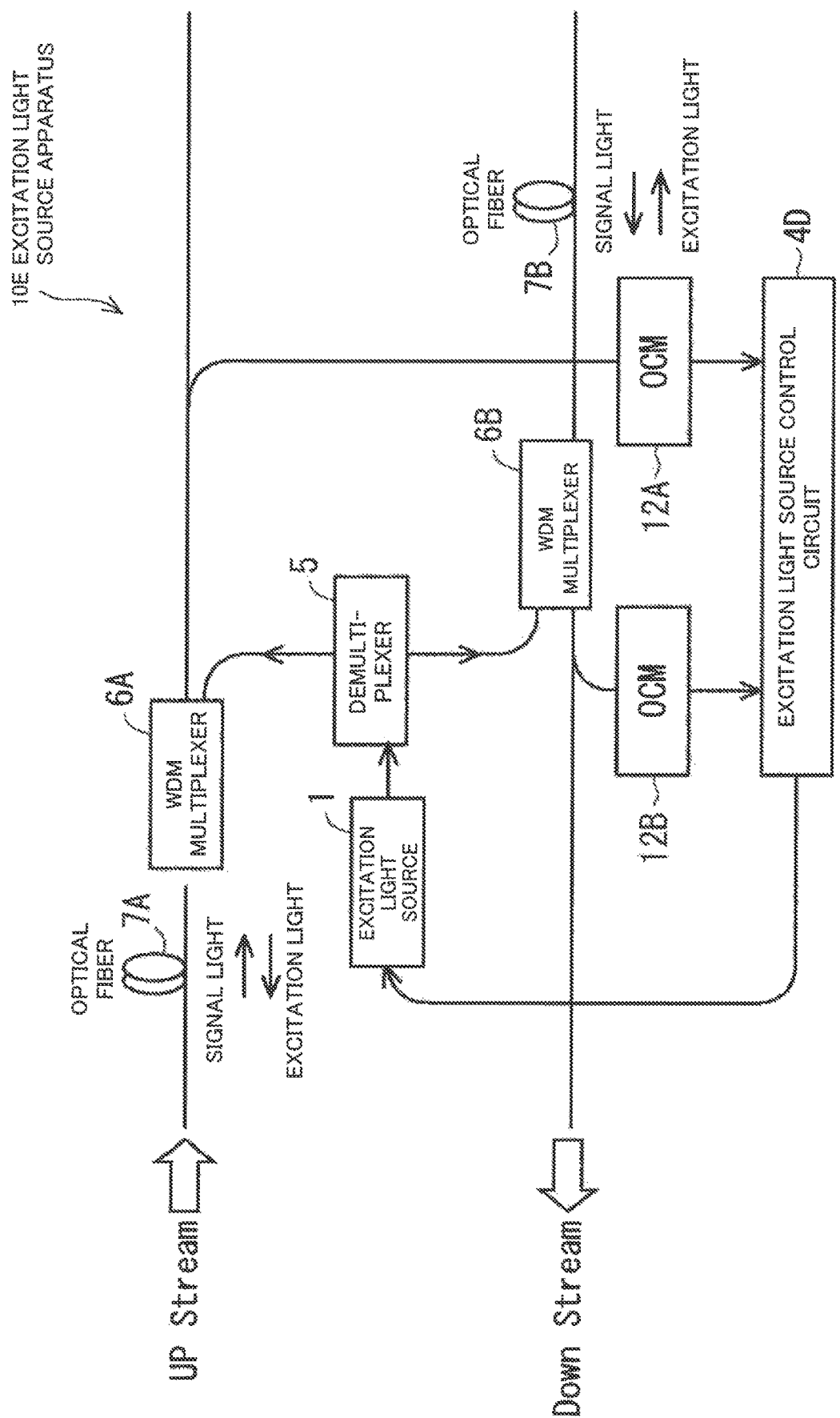
FIG. 14 is a block configuration diagram illustrating a configuration of an excitation light source apparatus in an eighth example embodiment of the present invention.

FIG. 14 is a block configuration diagram illustrating a configuration of an excitation light source apparatus according to the present example embodiment, and illustrates an example of a configuration different from that in FIG. 13 as an example of a configuration that automatically controls an excitation light source. Note that, an excitation light source apparatus 10E illustrated in FIG. 14 is illustrated as an independent apparatus, but may be certainly built in the gain equalizing apparatus 100 or the optical repeater 90 as described in FIGS. 10 and 11.

The excitation light source apparatus 10 in FIG. 1 includes the band pass filter 2A and the photo detector 3A for the upstream (UP) direction and the band pass filter 2B and the photo detector 3B for the downstream (DW) direction. Instead of such a configuration, the excitation light source apparatus 10E illustrated in FIG. 14 includes optical channel monitors (OCMs) 12A and 12B including a function of detecting level variations (tilt increase) of WDM signal light (main signal) for the upstream (UP) direction and the downstream (DW) direction, respectively. Further, the excitation light source apparatus 10E illustrated in FIG. 14 includes an excitation light source control circuit 4D including a function of automatically controlling an excitation light source 1, based on a detection result of the optical channel monitors 12A and 12B, instead of the excitation light source control circuit 4 in the excitation light source apparatus 10 in FIG. 1.

The excitation light source control circuit 4D is able to detect occurrence of a gain tilt of WDM signal light (main signal) by receiving a notification of occurrence of level variations (tilt increase) of the WDM signal light (main signal) as a detection result of the optical channel monitors 12A and 12B. Therefore, the excitation light source control circuit 4D calculates a power level of excitation light for Raman amplification needed to eliminate the gain tilt, starts the excitation light source 1, and outputs excitation light at a designated power level. As a result, input power of an optical repeater connected to a subsequent stage via an optical fiber is increased, and thereby a gain tilt amount can be automatically adjusted. Therefore, a gain tilt is able to be automatically adjusted even in a situation such as an increase in loss (LOSS) due to repair and aged deterioration of the optical fiber, and such a situation is able to be easily handled.

Note that, another alternative means capable of detecting an optical spectrum deviation of WDM signal light may be used for the optical channel monitors 12A and 12B. In such a case, presence or absence of occurrence of a gain tilt of WDM signal light (main signal) may be determined in the excitation light source control circuit 4D, based on information about the optical spectrum deviation of the WDM signal light detected by the alternative means.

Ninth Example Embodiment

Figure 15:
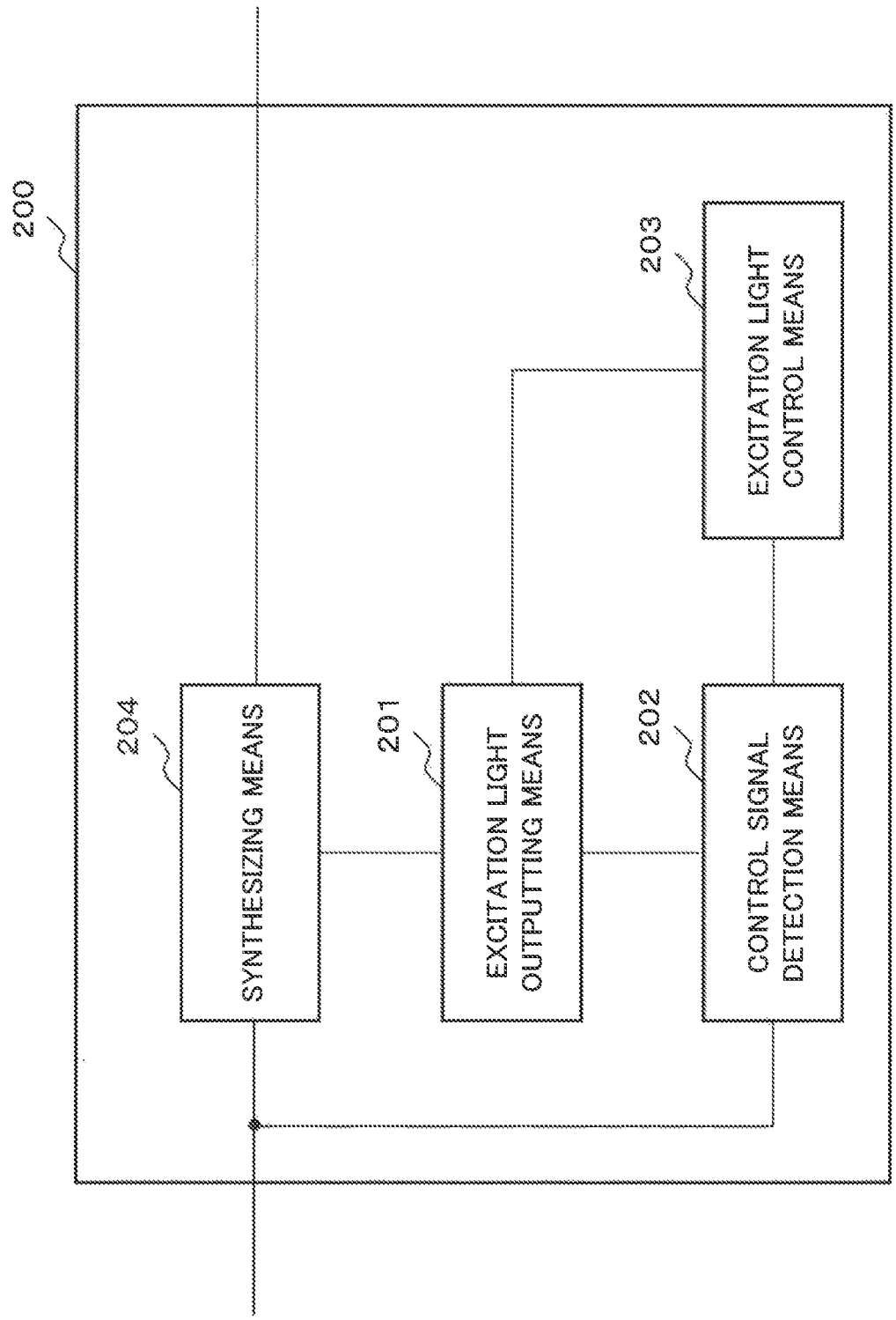
FIG. 15 is a block configuration diagram illustrating a configuration of an excitation light source apparatus in a ninth example embodiment of the present invention.

A ninth example embodiment of the present invention will be described with reference to a drawing. FIG. 15 is a block configuration diagram illustrating a configuration of an excitation light source apparatus 200 in the present example embodiment. The excitation light source apparatus 200 in the present example embodiment is an apparatus that is installed in a relay section of an optical fiber in an optical fiber transmission relay system transmitting WDM signal light having a multiplexed wavelength and outputs excitation light for Raman amplification at occurrence of a gain tilt of the WDM signal light. The excitation light source apparatus 200 in the present example embodiment includes an excitation light outputting means 201, a control signal detection means 202, an excitation light control means 203, and a multiplexing means 204.

The excitation light outputting means 201 outputs excitation light for Raman amplification. The control signal detection means 202 detects a control signal of the excitation light outputting means 201 from beams of WDM signal light transmitted through optical fibers in an upstream direction and a downstream direction. The excitation light control means 203 controls the excitation light outputting means 201, based on the control signal. The multiplexing means 204 multiplexes the excitation light and each of the beams of the WDM signal light in the upstream direction and the downstream direction, and outputs the respective multiplexed beams of light to the optical fiber in the upstream direction and the optical fiber in the downstream direction.

The excitation light source apparatus 200 in the present example embodiment detects a control signal from WDM signal light in the control signal detection means 202, and the excitation light control means 203 controls output of excitation light of the excitation light outputting means 201, based on the detected control signal. Further, the excitation light source apparatus 200 multiplexes the excitation light and each of the beams of the WDM signal light in the upstream direction and the downstream direction in the multiplexing means 204, and outputs the respective multiplexed beams of light to the optical fiber in the upstream direction and the optical fiber in the downstream direction. Thus, using the excitation light source apparatus 200 in the present example embodiment is able to control start of output of excitation light by transmitting a control signal via an optical fiber. Accordingly, an excellent optical transmission characteristic is able to be assured by performing gain equalization at occurrence of a gain tilt due to aged deterioration of the optical fiber and the like.

An installed number of an excitation light source apparatus, a gain equalizing apparatus built in the excitation light source apparatus, or an optical repeater built in the excitation light source apparatus according to each of the example embodiments above may not be only one in an optical transmission relay system. In other words, a plurality of excitation light source apparatuses, gain equalizing apparatuses built in the excitation light source apparatuses, or optical repeaters built in the excitation light source apparatuses according to each of the example embodiments above may be installed in an optical transmission relay system as necessary.

The excitation light source apparatus, the gain equalizing apparatus, and the optical repeater in each of the example embodiments described above may be each achieved in the following example embodiment.

(1) An excitation light source apparatus according to the present example embodiment installed in a relay section of an optical fiber in an optical fiber transmission relay system transmitting wavelength division multiplexing (WDM) signal light having a multiplexed wavelength and configured to output excitation light for Raman amplification at occurrence of a gain tilt of the WDM signal light, the excitation light source apparatus including:

an excitation light source configured to output excitation light for Raman amplification;

band pass filters for an upstream direction and a downstream direction each configured to extract control signal light for controlling the excitation light source from the WDM signal light transmitted through optical fibers in the upstream direction and the downstream direction;

photo detectors for the upstream direction and the downstream direction each configured to detect the control signal light output from each of the band pass filters for the upstream direction and the downstream direction, convert the control signal light into an electric signal, and output the electric signal as a control signal;

an excitation light source control circuit configured to control the excitation light source, based on the control signal output from each of the photo detectors for the upstream direction and the downstream direction;

a demultiplexer configured to separate the excitation light output from the excitation light source into excitation light for the upstream direction and excitation light for the downstream direction; and two multiplexers configured to multiplexe the excitation light for the upstream direction separated by the demultiplexer and the WDM signal light in the upstream direction, multiplexe the excitation light for the downstream direction and the WDM signal light in the downstream direction, and output the corresponding multiplexed light to each of the optical fiber in the upstream direction and the optical fiber in the downstream direction.

(2) A gain equalizing apparatus according to the present example embodiment, wherein the excitation light source apparatus described in (1) mentioned above is built in a gain equalizing apparatus that is disposed as a structural component of an optical fiber transmission relay system transmitting wavelength division multiplexing (WDM) signal light having a multiplexed wavelength in a relay section on an optical fiber and includes a gain equalizing function of compensating for a deviation of a gain wavelength characteristic of the WDM signal light transmitted to the optical fiber.

(3) An optical repeater according to the present example embodiment, wherein the excitation light source apparatus described in (1) mentioned above is built in an optical repeater that is disposed, as a structural component of an optical fiber transmission relay system transmitting wavelength division multiplexing (WDM) signal light having a multiplexed wavelength, in a relay section on an optical fiber and includes a function of amplifying and relaying the WDM signal light transmitted to the optical fiber.

The following effects is able to be achieved by the excitation light source apparatus, the gain equalizing apparatus, and the optical repeater in the above-mentioned example embodiments. In other words, in each of the example embodiments of the present invention, the excitation light source apparatus for Raman amplification is installed in a relay section of an optical fiber (optical transmission path) in an optical fiber transmission relay system that transmits WDM signal light. When loss variations in the optical transmission path occur due to aged deterioration, repair, and the like of the optical fiber and a gain tilt of the WDM signal light then occurs, the excitation light source apparatus is started, and input power of the WDM signal light to an optical repeater on a subsequent stage is properly controlled by a Raman amplification effect by excitation light from an excitation light source. Thus, occurrence of a gain tilt in an optical repeater on the following stage is able to be suppressed, and an excellent optical transmission characteristic is able to be assured.

The whole or part of the example embodiments disclosed above can be described as, but not limited to, the following supplementary notes.

(Supplementary Note 1)

An excitation light source apparatus installed in a relay section of an optical fiber in an optical fiber transmission relay system transmitting wavelength division multiplexing (WDM) signal light being wavelength-multiplexed and configured to output excitation light for Raman amplification at occurrence of a gain tilt of the WDM signal light, the excitation light source apparatus comprising:

an excitation light outputting means for outputting excitation light for Raman amplification;

a control signal detection means for detecting a control signal of the excitation light outputting means from beams of the WDM signal light transmitted through optical fibers in an upstream direction and a downstream direction;

an excitation light control means for controlling the excitation light outputting means, based on the control signal; and a multiplexing means for multiplexing the excitation light and each of the beams of the WDM signal light in the upstream direction and the downstream direction and outputting the respective multiplexed beams of light to the optical fiber in the upstream direction and the optical fiber in the downstream direction.

(Supplementary Note 2)

The excitation light source apparatus according to supplementary note 1, wherein the excitation light outputting means comprises a means for outputting a plurality of beams of the excitation light having different wavelengths, and the multiplexing means multiplexes the excitation light obtained by multiplexing the plurality of beams of excitation light having different wavelengths being output from the excitation light outputting means and each of the beams of the WDM signal light in the upstream direction and the downstream direction, and outputs the respective multiplexed beams of light to the optical fiber in the upstream direction and the optical fiber in the downstream direction.

(Supplementary Note 3)

The excitation light source apparatus according to supplementary note 1 or 2, further comprising:

a variable attenuating means for attenuating a power level of the excitation light output from the excitation light outputting means and outputting the excitation light, wherein the multiplexing means multiplexes the excitation light attenuated by the attenuating means and each of the beams of the WDM signal light in the upstream direction and the downstream direction, and outputs the respective multiplexed beams of light to the optical fiber in the upstream direction and the optical fiber in the downstream direction.

(Supplementary Note 4)

The excitation light source apparatus according to any one of supplementary notes 1 to 3, further comprising:

a demultiplexing means for separating the excitation light output from the excitation light outputting means into the excitation light for the upstream direction and the excitation light for the downstream direction, wherein the multiplexing means multiplexes the excitation light for the upstream direction separated by the demultiplexing means and the WDM signal light in the upstream direction and outputs the multiplexed light to the optical fiber in the upstream direction, and multiplexes the excitation light for the downstream direction and the WDM signal light in the downstream direction and outputs the multiplexed light to the optical fiber in the downstream direction.

(Supplementary Note 5)

The excitation light source apparatus according to any one of supplementary notes 1 to 3, wherein the excitation light outputting means comprises an excitation light source for the upstream direction and an excitation light source for the downstream direction, and the excitation light control means separately controls the excitation light source for the upstream direction and the excitation light source for the downstream direction, based on the control signal.

(Supplementary Note 6)

The excitation light source apparatus according to any one of supplementary notes 1 to 5, wherein the control signal detection means further comprises a signal extracting means for extracting control signal light for controlling the excitation light outputting means from the WDM signal light transmitted through the optical fibers in the upstream direction and the downstream direction from each of the optical fibers in the upstream direction and the downstream direction, and the control signal detection means converts the control signal light into an electric signal and outputs the electric signal as the control signal.

(Supplementary Note 7)

The excitation light source apparatus according to any one of supplementary notes 1 to 5, wherein the control signal detection means detects power levels on the shortest wavelength side and the longest wavelength side in a main signal of the WDM signal light in the upstream direction and power levels on the shortest wavelength side and the longest wavelength side in a main signal of the WDM signal light in the downstream direction, and when the excitation light control means compares the power levels on each of the shortest wavelength side and the longest wavelength side in the WDM signal light in the upstream direction and the WDM signal light in the downstream direction and detects occurrence of a power level deviation in the main signal of at least one of the WDM signal lights in the upstream direction and the downstream direction, the excitation light control means calculates a power level of the excitation light needed to eliminate the power level deviation and controls output of the excitation light in such a way that excitation light at the calculated power level is output from the excitation light outputting means.

(Supplementary Note 8)

The excitation light source apparatus according to any one of supplementary notes 1 to 5, wherein the control signal detection means further comprises a means for detecting variations in a power level of a main signal of the WDM signal light transmitted through the optical fibers in the upstream direction and the downstream direction, and when the excitation light control means detects occurrence of a gain tilt of the main signal, based on a detection result of the variations in the power level of the main signal, the excitation light control means calculates a power level of the excitation light needed to eliminate the gain tilt and controls the excitation light outputting means in such a way that excitation light at the calculated power level is output from the excitation light outputting means.

(Supplementary Note 9)

The excitation light source apparatus according to any one of supplementary notes 1 to 7, wherein the control signal light transmitted through the optical fibers in the upstream direction and the downstream direction is sent, based on a result of monitoring optical transmission quality by a terminal apparatus constituting the optical fiber transmission relay system, from the terminal apparatus.

(Supplementary Note 10)

A gain equalizing circuit comprising the excitation light source apparatus according to any one of supplementary notes 1 to 9 being incorporated in a gain equalizing apparatus that is disposed, as a structural component of an optical fiber transmission relay system transmitting wavelength division multiplexing (WDM) signal light being wavelength-multiplexed, in a relay section on an optical fiber and comprises a gain equalizing function of compensating for a deviation of a gain wavelength characteristic of the WDM signal light transmitted to the optical fiber.

(Supplementary Note 11)

A gain equalizing circuit comprising the excitation light source apparatus according to any one of supplementary notes 1 to 9 being incorporated in an optical repeater that is disposed, as a structural component of an optical fiber transmission relay system transmitting wavelength division multiplexing (WDM) signal light being wavelength-multiplexed, in a relay section on an optical fiber and comprises a function of amplifying and relaying the WDM signal light transmitted to the optical fiber.

(Supplementary Note 12)

A gain equalizing method that is installed in a relay section of an optical fiber in an optical fiber transmission relay system transmitting wavelength division multiplexing (WDM) signal light being wavelength-multiplexed and is used at occurrence of a gain tilt of the WDM signal light, the gain equalizing method comprising:

detecting a control signal of an excitation light source configured to output excitation light for Raman amplification from beams of the WDM signal light transmitted through optical fibers in an upstream direction and a downstream direction;

controlling the excitation light source, based on the control signal;

outputting the excitation light for Raman amplification from the excitation light source; and multiplexing the excitation light and each of the beams of the WDM signal light in the upstream direction and the downstream direction and outputting the respective multiplexed beams of light to the optical fiber in the upstream direction and the optical fiber in the downstream direction.

(Supplementary Note 13)

The gain equalizing method according to supplementary note 12, further comprising:

outputting beams of the excitation light from a plurality of the excitation light sources configured to output the excitation light having different wavelengths; and multiplexing the excitation light obtained by multiplexing the beams of excitation light output from the plurality of excitation light sources and each of the beams of the WDM signal light in the upstream direction and the downstream direction, and outputting the respective multiplexed beams of light to the optical fiber in the upstream direction and the optical fiber in the downstream direction.

(Supplementary Note 14)

The gain equalizing method according to supplementary note 13 or 14, further comprising:

attenuating a power level of the excitation light output from the excitation light source and outputting the excitation light; and multiplexing the attenuated excitation light and each of the beams of the WDM signal light in the upstream direction and the downstream direction, and outputting the respective multiplexed beams of light to the optical fiber in the upstream direction and the optical fiber in the downstream direction.

(Supplementary Note 15)

The gain equalizing method according to any one of supplementary notes 12 to 14, further comprising:

separating the excitation light output from the excitation light source into the excitation light for the upstream direction and the excitation light for the downstream direction; and multiplexing the separated excitation light for the upstream direction and the WDM signal light in the upstream direction and outputting the multiplexed light to the optical fiber in the upstream direction, and multiplexing the excitation light for the downstream direction and the WDM signal light in the downstream direction and outputting the multiplexed light to the optical fiber in the downstream direction.

(Supplementary Note 16)

The gain equalizing method according to any one of supplementary notes 12 to 14, further comprising:

separately controlling an excitation light source for the upstream direction and an excitation light source for the downstream direction, based on the control signal; and outputting the excitation light from each of the excitation light source for the upstream direction and the excitation light source for the downstream direction.

(Supplementary Note 17)

The gain equalizing method according to any one of supplementary notes 12 to 16, further comprising:

extracting control signal light for controlling the excitation light source from the WDM signal light transmitted through the optical fibers in the upstream direction and the downstream direction from each of the optical fibers in the upstream direction and the downstream direction; and converting the control signal light into an electric signal and outputting the electric signal as the control signal.

(Supplementary Note 18)

The gain equalizing method according to any one of supplementary notes 12 to 16, further comprising:

detecting power levels on the shortest wavelength side and the longest wavelength side in a main signal of the WDM signal light in the upstream direction and power levels on the shortest wavelength side and the longest wavelength side in a main signal of the WDM signal light in the downstream direction; and when the power levels are compared on each of the shortest wavelength side and the longest wavelength side in the WDM signal light in the upstream direction and the WDM signal light in the downstream direction and occurrence of a power level deviation is detected in the main signal of at least one of the WDM signal light in the upstream direction and the WDM signal light in the downstream direction, calculating a power level of the excitation light needed to eliminate the power level deviation and controlling the excitation light source in such a way that excitation light at the calculated power level is output from the excitation light outputting means.

(Supplementary Note 19)

The gain equalizing method according to any one of supplementary notes 12 to 16, further comprising:

detecting variations in a power level of a main signal of the WDM signal light transmitted through the optical fibers in the upstream direction and the downstream direction; and when occurrence of a gain tilt of the main signal is detected, based on a detection result of the variations in the power level of the main signal, calculating a power level of the excitation light needed to eliminate the gain tilt and controlling output of the excitation light in such a way that excitation light at the calculated power level is output from the excitation light outputting means.

(Supplementary Note 20)

The gain equalizing method according to any one of supplementary notes 12 to 18, wherein the control signal light transmitted through the optical fibers in the upstream direction and the downstream direction is sent, based on a result of monitoring optical transmission quality by a terminal apparatus constituting the optical fiber transmission relay system, from the terminal apparatus.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2016-67731, filed on Mar. 30, 2016, the disclosure of which is incorporated herein in its entirety by reference.

REFERENCE SIGNS LIST

1 Excitation light source
1A Excitation light source
1B Excitation light source
2A Band pass filter (BPF)
2B Band pass filter (BPF)
3A Photo detector (PD)
$3A_1$, $3A_2$ Photo detector (PD)
3B Photo detector (PD)
$3B_1$, $3B_2$ Photo detector (PD)
4 Excitation light source control circuit
4A Excitation light source control circuit
4B Excitation light source control circuit
4C Excitation light source control circuit
4D Excitation light source control circuit
5 Demultiplexer 5,
6A WDM multiplexer
6B WDM multiplexer
7A Optical fiber
7B Optical fiber
8 Excitation light multiplexer
8A Terminal apparatus
8B Terminal apparatus
9 Variable attenuator
10 Excitation light source apparatus
10A Excitation light source apparatus
10B Excitation light source apparatus
10C Excitation light source apparatus
10D Excitation light source apparatus
10E Excitation light source apparatus
11, . . . , and 1N Excitation light source
12A Optical channel monitor (OCM)
12B Optical channel monitor (OCM)
51 Raman gain (by excitation light having wavelength kp1)
52 Raman gain (by excitation light having wavelength kp2)
53 Raman gain (by excitation light having wavelength kp3)
54 Total gain
54A Total gain
71, . . . , 7i, 7j, . . . , 7k, 7l, . . . , 7n Optical fiber
90 Optical repeater
91 Optical repeater
91A Optical amplifier
91B Optical amplifier
92, 93, . . . , 9i, 9j, . . . , 9k, 9l, . . . , 9n Optical repeater
100 Gain equalizing apparatus
101A Gain equalizing circuit
101B Gain equalizing circuit
200 Excitation light source apparatus
201 Excitation light outputting means
202 Control signal detection means
203 Excitation light control means
204 Multiplexing means

What is claimed is:

1. An excitation light source apparatus installed in a relay section of an optical fiber in an optical fiber transmission relay system transmitting wavelength division multiplexing (WDM) signal light being wavelength-multiplexed and configured to output excitation light for Raman amplification at occurrence of a gain tilt of the WDM signal light, the excitation light source apparatus comprising:

an excitation light outputting unit which outputs excitation light for Raman amplification;

a control signal detection unit which detects a control signal of the excitation light outputting unit from beams of the WDM signal light transmitted through optical fibers in an upstream direction and in a downstream direction;

an excitation light control unit which controls the excitation light outputting unit, based on the control signal; and a multiplexing unit which multiplexes the excitation light and each of the beams of the WDM signal light in the upstream direction and the downstream direction and outputs the respective multiplexed beams of light to an optical fiber in the upstream direction and to an optical fiber in the downstream direction, wherein the control signal detection unit detects power levels on a shortest wavelength side and a longest wavelength side in a main signal of the WDM signal light in the upstream direction and power levels on a shortest wavelength side and a longest wavelength side in a main signal of the WDM signal light in the downstream direction, respectively, and when the excitation light control unit compares respective power levels on the shortest wavelength side and the longest wavelength side in the WDM signal light in the upstream direction and the WDM signal light in the downstream direction and detects occurrence of a power level deviation in a main signal of at least one of the WDM signal light in the upstream direction and the WDM signal light in the downstream direction, the excitation light control unit calculates a power level of the excitation light needed to eliminate the power level deviation and controls output of the excitation light in such a way that excitation light at the calculated power level is output from the excitation light outputting unit.

2. An excitation light source apparatus installed in a relay section of an optical fiber in an optical fiber transmission relay system transmitting wavelength division multiplexing (WDM) signal light being wavelength-multiplexed and configured to output excitation light for Raman amplification at occurrence of a gain tilt of the WDM signal light, the excitation light source apparatus comprising:

an excitation light outputting unit which outputs excitation light for Raman amplification;

a control signal detection unit which detects a control signal of the excitation light outputting unit from beams of the WDM signal light transmitted through optical fibers in an upstream direction and in a downstream direction;

an excitation light control unit which controls the excitation light outputting unit, based on the control signal; and a multiplexing unit which multiplexes the excitation light and each of the beams of the WDM signal light in the upstream direction and the downstream direction and outputs the respective multiplexed beams of light to an optical fiber in the upstream direction and to an optical fiber in the downstream direction, wherein the control signal detection unit detects variations in a power level of a main signal of the WDM signal light transmitted through the optical fibers in the upstream direction and the downstream direction, and when the excitation light control unit detects occurrence of a gain tilt of the main signal, based on a detection result of variations in the power level of the main signal, the excitation light control unit calculates a power level of the excitation light needed to eliminate the gain tilt and controls the excitation light outputting unit in such a way that excitation light at the calculated power level is output from the excitation light outputting unit.

3. The excitation light source apparatus according to claim 1, wherein the excitation light outputting unit outputs a plurality of beams of the excitation light having different wavelengths, and the multiplexing unit multiplexes the excitation light obtained by multiplexing a plurality of beams of the excitation light having different wavelengths being output from the excitation light outputting unit and each of the beams of the WDM signal light in the upstream direction and the downstream direction, and outputs the respective multiplexed beams of light to an optical fiber in the upstream direction and an optical fiber in the downstream direction.

4. The excitation light source apparatus according to claim 1, further comprising a variable attenuating unit which attenuates a power level of the excitation light output from the excitation light outputting unit and outputs the excitation light, wherein the multiplexing unit multiplexes the excitation light attenuated by the variable attenuating unit and each of the beams of the WDM signal light in the upstream direction and the downstream direction, and outputs the respective multiplexed beams of light to an optical fiber in the upstream direction and an optical fiber in the downstream direction.

5. The excitation light source apparatus according to claim 1, further comprising:

a demultiplexing unit which separates the excitation light output from the excitation light outputting unit into the excitation light for the upstream direction and the excitation light for the downstream direction, wherein the multiplexing unit multiplexes the excitation light for the upstream direction separated by the demultiplexing unit and the WDM signal light in the upstream direction and outputs the multiplexed light to an optical fiber in the upstream direction, and multiplexes the excitation light for the downstream direction and the WDM signal light in the downstream direction and outputs the multiplexed light to an optical fiber in the downstream direction.

6. The excitation light source apparatus according to claim 1, wherein the excitation light outputting unit comprises an excitation light source for the upstream direction and an excitation light source for the downstream direction, and the excitation light control unit separately controls the excitation light source for the upstream direction and the excitation light source for the downstream direction, based on the control signal.

7. The excitation light source apparatus according to claim 1, wherein the control signal detection unit further comprises a signal extracting unit which extracts control signal light for controlling the excitation light outputting unit from the WDM signal light transmitted through optical fibers in the upstream direction and the downstream direction from each of optical fibers in the upstream direction and the downstream direction, and the control signal detection unit converts the control signal light into an electric signal and outputs the electric signal as the control signal.

8. The excitation light source apparatus according to claim 1, wherein the control signal light transmitted through respective optical fibers in the upstream direction and the downstream direction is sent, based on a result of monitoring optical transmission quality by a terminal apparatus constituting the optical fiber transmission relay system, from the terminal apparatus.

9. A gain equalizing circuit comprising:
the excitation light source apparatus according to claim 1, being incorporated, in a gain equalizing apparatus that is disposed as a structural component of an optical fiber transmission relay system transmitting wavelength division multiplexing (WDM) signal light being wavelength-multiplexed in a relay section on an optical fiber and has a gain equalizing function of compensating for a deviation of a gain wavelength characteristic of the WDM signal light transmitted to the optical fiber.

10. A gain equalizing circuit comprising
the excitation light source apparatus according to claim 1, being incorporated, in an optical repeater that is disposed as a structural component of an optical fiber transmission relay system transmitting wavelength division multiplexing (WDM) signal light being wavelength-multiplexed in a relay section on an optical fiber and has a function of amplifying and relaying the WDM signal light transmitted to the optical fiber.

11. The excitation light source apparatus according to claim 2, wherein
the excitation light outputting unit outputs a plurality of beams of the excitation light having different wavelengths, and
the multiplexing unit multiplexes the excitation light obtained by multiplexing a plurality of beams of the excitation light having different wavelengths being output from the excitation light outputting unit and each of the beams of the WDM signal light in the upstream direction and the downstream direction, and outputs the respective multiplexed beams of light to an optical fiber in the upstream direction and an optical fiber in the downstream direction.

12. The excitation light source apparatus according to claim 2, further comprising
a variable attenuating unit which attenuates a power level of the excitation light output from the excitation light outputting unit and outputs the excitation light, wherein
the multiplexing unit multiplexes the excitation light attenuated by the variable attenuating unit and each of the beams of the WDM signal light in the upstream direction and the downstream direction, and outputs the respective multiplexed beams of light to an optical fiber in the upstream direction and an optical fiber in the downstream direction.

13. The excitation light source apparatus according to claim 2, further comprising
a demultiplexing unit which separates the excitation light output from the excitation light outputting unit into the excitation light for the upstream direction and the excitation light for the downstream direction, wherein
the multiplexing unit multiplexes the excitation light for an upstream direction separated by the demultiplexing unit and the WDM signal light in the upstream direction and outputs the multiplexed light to an optical fiber in the upstream direction, and multiplexes the excitation light for the downstream direction and the WDM signal light in the downstream direction and outputs the multiplexed light to an optical fiber in the downstream direction.

14. The excitation light source apparatus according to claim 2, wherein
the excitation light outputting unit comprises an excitation light source for the upstream direction and an excitation light source for the downstream direction, and
the excitation light control unit separately controls the excitation light source for the upstream direction and the excitation light source for the downstream direction, based on the control signal.

15. The excitation light source apparatus according to claim 2, wherein
the control signal detection unit further comprises a signal extracting unit which extracts control signal light for controlling the excitation light outputting unit from the WDM signal light transmitted through optical fibers in the upstream direction and the downstream direction from each of optical fibers in the upstream direction and the downstream direction, and
the control signal detection unit converts the control signal light into an electric signal and outputs the electric signal as the control signal.

16. The excitation light source apparatus according to claim 2, wherein
the control signal light transmitted through respective optical fibers in the upstream direction and the downstream direction is sent, based on a result of monitoring optical transmission quality by a terminal apparatus constituting the optical fiber transmission relay system, from the terminal apparatus.

17. A gain equalizing circuit comprising:
the excitation light source apparatus according to claim 2, being incorporated, in a gain equalizing apparatus that is disposed as a structural component of an optical fiber transmission relay system transmitting wavelength division multiplexing (WDM) signal light being wavelength-multiplexed in a relay section on an optical fiber and has a gain equalizing function of compensating for a deviation of a gain wavelength characteristic of the WDM signal light transmitted to the optical fiber.

18. A gain equalizing circuit comprising
the excitation light source apparatus according to claim 2, being incorporated, in an optical repeater that is disposed as a structural component of an optical fiber transmission relay system transmitting wavelength division multiplexing (WDM) signal light being wavelength-multiplexed in a relay section on an optical fiber and has a function of amplifying and relaying the WDM signal light transmitted to the optical fiber.

19. A gain equalizing method that is installed in a relay section of an optical fiber in an optical fiber transmission relay system transmitting wavelength division multiplexing (WDM) signal light being wavelength-multiplexed and is used at occurrence of a gain tilt of the WDM signal light, the gain equalizing method comprising:
detecting a control signal of an excitation light source configured to output excitation light for Raman amplification from beams of the WDM signal light transmitted through optical fibers in an upstream direction and in a downstream direction;
controlling the excitation light source, based on the control signal; outputting the excitation light for Raman amplification from the excitation light source;
multiplexing the excitation light and each of the beams of the WDM signal light in the upstream direction and the downstream direction and outputting the respective multiplexed beams of light to an optical fiber in the upstream direction and to an optical fiber in the downstream direction, detecting power levels on a shortest wavelength side and a longest wavelength side in a main signal of the WDM signal light in the upstream direction and power levels on a shortest wavelength side and a longest wavelength side in a main signal of the WDM signal light in the downstream direction, respectively; and when respective power levels are compared on the shortest wavelength side and the longest wavelength side in the WDM signal light in the upstream direction and the WDM signal light in the downstream direction and occurrence of a power level deviation is detected in a main signal of at least one of the WDM signal light in the upstream direction and the WDM signal light in the downstream direction, calculating a power level of the excitation light needed to eliminate the power level deviation and controlling the excitation light source in such a way that excitation light at the calculated power level is output from the excitation light source.

20. The gain equalizing method according to claim 19, further comprising:

outputting beams of the excitation light from a plurality of the excitation light sources configured to output the excitation light having different wavelengths; and multiplexing the excitation light obtained by multiplexing beams of the excitation light respectively output from a plurality of the excitation light sources and each of the beams of the WDM signal light in the upstream direction and the downstream direction, and outputting the respective multiplexed beams of light to an optical fiber in the upstream direction and an optical fiber in the downstream direction.

\* \* \* \* \*